United States Patent
Miracle et al.

(10) Patent No.: US 10,696,929 B2
(45) Date of Patent: Jun. 30, 2020

(54) LAUNDRY CARE COMPOSITION COMPRISING POLYETHYLENE GLYCOL-BASED PARTICLES COMPRISING A LEUCO COLORANT

(71) Applicant: The Procter & Gamble Company, Cincinnati, OH (US)

(72) Inventors: Gregory Scot Miracle, Liberty Township, OH (US); Daniel Dale Ditullio, Hamilton, OH (US)

(73) Assignee: The Procter & Gamble Company, Cincinnati, OH (US)

(*) Notice: Subject to any disclaimer, the term of this patent is extended or adjusted under 35 U.S.C. 154(b) by 0 days.

(21) Appl. No.: 16/352,917

(22) Filed: Mar. 14, 2019

(65) Prior Publication Data

US 2019/0292497 A1    Sep. 26, 2019

Related U.S. Application Data

(60) Provisional application No. 62/645,822, filed on Mar. 21, 2018.

(51) Int. Cl.
| | | |
|---|---|---|
| *C11D 3/40* | (2006.01) | |
| *C11D 3/42* | (2006.01) | |
| *C11D 3/00* | (2006.01) | |
| *C11D 3/37* | (2006.01) | |
| *C11D 17/06* | (2006.01) | |
| *C11D 11/00* | (2006.01) | |
| *C09B 11/12* | (2006.01) | |
| *C11D 3/50* | (2006.01) | |

(52) U.S. Cl.
CPC ........... *C11D 3/42* (2013.01); *C11D 3/0084* (2013.01); *C11D 3/3707* (2013.01); *C11D 3/40* (2013.01); *C11D 11/0017* (2013.01); *C11D 17/06* (2013.01); *C09B 11/12* (2013.01); *C11D 3/50* (2013.01)

(58) Field of Classification Search
CPC .. C11D 3/40; C11D 3/42; C11D 3/502; C11D 3/505; C11D 9/08; C11D 9/225; C11D 9/44; C11D 9/444; C11D 9/448; C11D 11/0017

See application file for complete search history.

(56) References Cited

U.S. PATENT DOCUMENTS

| | | | |
|---|---|---|---|
| 2010/0069283 A1* | 3/2010 | Prabhat | C11D 3/42 |
| | | | 510/307 |
| 2015/0111807 A1* | 4/2015 | Miracle | C11D 3/3723 |
| | | | 510/325 |
| 2016/0168517 A1* | 6/2016 | Massey-Brooker | C11D 1/29 |
| | | | 510/296 |
| 2017/0175051 A1* | 6/2017 | Fernandes | C09B 67/0007 |
| 2018/0119056 A1* | 5/2018 | Qin | C09B 11/12 |
| 2018/0127692 A1* | 5/2018 | Coope-Epstein | C11D 17/043 |
| 2018/0245025 A1* | 8/2018 | Qin | C09B 11/10 |

OTHER PUBLICATIONS

U.S. Appl. No. 16/352,913, filed Mar. 14, 2019, Miracle, et al.

* cited by examiner

*Primary Examiner* — Charles I Boyer
(74) *Attorney, Agent, or Firm* — John T. Dipre

(57) ABSTRACT

A laundry care composition having a carrier and a leuco colorant.

14 Claims, 5 Drawing Sheets

LAUNDRY CARE COMPOSITION COMPRISING POLYETHYLENE GLYCOL-BASED PARTICLES COMPRISING A LEUCO COLORANT

FIELD OF THE INVENTION

Laundry care compostion.

BACKGROUND OF THE INVENTION

As textile substrates age, their color tends to fade or yellow due to exposure to light, air, soil, and natural degradation of the fibers that comprise the substrates. As such, to visually enhance these textile substrates and counteract the fading and yellowing the use of polymeric colorants for coloring consumer products has become well known in the prior art. For example, it is well known to use whitening agents, either optical brighteners or bluing agents, in textile applications. However, traditional whitening agents tend to lose efficacy upon storage due to deleterious interactions with other formulation components (such as, for example, perfumes). Further, such whitening agents can suffer from poor deposition on textile substrates. As such, formulators tend to increase the level of whitening agent used to counteract any efficacy lost upon storage and/or to increase the amount of whitening agent available to deposit on the textile substrate.

Leuco dyes are also known in the prior art to exhibit a change from a colorless or slightly colored state to a colored state upon exposure to specific chemical or physical triggers. The change in coloration that occurs is typically visually perceptible to the human eye. Many of these compounds have some absorbance in the visible light region (400-750 nm), and thus more or less have some color. In this invention, a dye is considered as a "leuco dye" if it did not render a significant color at its application concentration and conditions, but renders a significant color in its triggered form. The color change upon triggering stems from the change of the molar attenuation coefficient (also known as molar extinction coefficient, molar absorption coefficient, and/or molar absorptivity in some literatures) of the leuco dye molecule in the 400-750 nm range, preferably in the 500-650 nm range, and most preferably in the 530-620 nm range. The increase of the molar attenuation coefficient of a leuco dye before and after the triggering should be greater than 50%, more preferably greater than 200%, and most preferably greater than 500%.

Leuco compounds can be used as whitening agents in laundry care compositions (e.g., laundry detergents). In such uses, the addition of the leuco compound, which is an uncolored or only lightly colored state, does not significantly affect the aesthetics of the laundry care composition. Then, the leuco compound can be converted to a colored state in which it imparts the desired whitening benefit to the textile substrate.

The purpose of leuco colorants is generally to visually whiten these textile substrates and counteract the fading and yellowing of the substrates. Typically, leuco colorants may be found in laundry detergents and are therefore applied to textile substrates during the laundering process. When the leuco colorant is in a laundry detergent, however, the consumer does not have the flexibility to customize their desired experience. Extra whitening can be achieved only by adding additional detergent, which necessitates increased and potentially wasteful levels of cleaning ingredients and may also result in deposition of too much fragrance. Thus, the consumer cannot balance their desire for efficient usage of cleaning ingredients, adjusting for the right amount of scent, and yet also be able to deliver variable amounts of whitening according to the needs of the particular fabrics being treated.

As a result, there exists a need for a laundry care composition so that leuco colorant may be used independently as an additive to satisfy the consumer desire for adjustable dose, on-demand whitening while delivering the benefits of a leuco colorant from a particle of low color or color other than that of the leuco colorant.

One of the challenges of delivering whiteness benefits using a hueing technology is that consumers often possess garments that are designed to be lightly colored, such as pastels, and the application of hueing, shading or bluing agents can compromise the intended color for such garments, leading to consumer dissatisfaction. There is a continuing need to develop approaches for hueing that selectively deposit on aged cotton garments (those which are most likely to have developed yellowing over time that can benefit from color correction) and deposit less well on new, clean cotton garments that have no need for color correction.

We have discovered that leuco colorants can display a bias for depositing on consumer-sourced, aged cotton garments over new, clean cotton. Leuco colorants are thus better able to deliver a whitening benefit where it is needed, and avoid hueing new, clean cotton garments where such hueing might well be considered undesirable.

It has surprisingly been found that the laundry care compositions of the present disclosure which incorporate leuco colorants are not only effective at whitening of textile substrates without dictating the color of the composition, but also provide a clean and convenient means to add the consumer-desired amount of a whitening agent to a laundry treatment without adversely impacting the colors of newer garments.

SUMMARY OF THE INVENTION

A laundry care composition comprising a plurality of particles, wherein at least one of the particles, more preferably at least 10%, 25% or even 50% of said particles, comprise: a carrier; and a leuco colorant; wherein at least 80% of the particles have a density less than about 1.25 g/cm$^3$; wherein at least 80% of the particles have a mass between about 0.1 mg to about 5 g; and wherein each of the particles has a maximum dimension of less than about 10 mm.

A process for treating laundry comprising the steps of dosing to a laundry washing machine or a laundry wash basin per 3 kg of fabric being laundered, from about 0.1 g to about 200 g, or from about 0.5 g to about 100 g, or from about 2.0 g to about 60 g, or from about 5 g to about 25 g of particles, the particles comprising: a carrier; and leuco colorant; and wherein at least 80% of the particles have a density less than about 1.25 g/cm$^3$; wherein at least 80% of the particles have a mass between about 0.1 mg to about 5 g; and wherein substantially all of the particles have a maximum dimension of less than about 10 mm; said dosing providing an aqueous solution comprising leuco colorant from 1 ppb to 5000 ppm, preferably 10 ppb to 50 ppm, even more preferably 25 ppb to 5 ppm or even 50 ppb to 2 ppm; and optionally rinsing and drying the textile.

DETAILED DESCRIPTION OF THE INVENTION

Definitions

Figure 1:
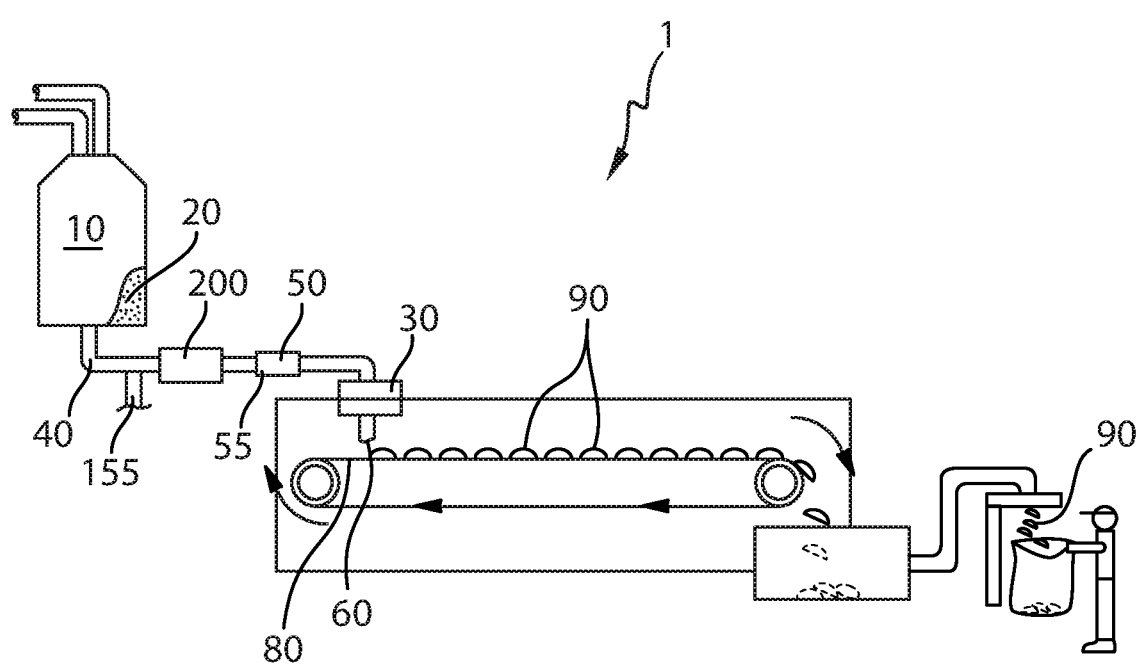
FIG. 1 is an apparatus for forming particles.

As used herein, the term "alkoxy" is intended to include $C_1$-$C_8$ alkoxy and alkoxy derivatives of polyols having repeating units such as butylene oxide, glycidol oxide, ethylene oxide or propylene oxide.

As used herein, the interchangeable terms "alkyleneoxy" and "oxyalkylene," and the interchangeable terms "polyalkyleneoxy" and "polyoxyalkylene," generally refer to molecular structures containing one or more than one, respectively, of the following repeating units: —$C_2H_4O$—, —$C_3H_6O$—, —$C_4H_8O$—, and any combinations thereof. Non-limiting structures corresponding to these groups include —$CH_2CH_2O$—, —$CH_2CH_2CH_2O$—, —$CH_2CH_2CH_2CH_2O$—, —$CH_2CH(CH_3)O$—, and —$CH_2CH(CH_2CH_3)O$—, for example. Furthermore, the polyoxyalkylene constituent may be selected from the group consisting of one or more monomers selected from a $C_{2-20}$ alkyleneoxy group, a glycidyl group, or mixtures thereof.

The terms "ethylene oxide," "propylene oxide" and "butylene oxide" may be shown herein by their typical designation of "EO," "PO" and "BO," respectively.

As used herein, the terms "alkyl" and "alkyl capped" are intended to mean any univalent group formed by removing a hydrogen atom from a substituted or unsubstituted hydrocarbon. Non-limiting examples include hydrocarbyl moieties which are branched or unbranched, substituted or unsubstituted including $C_1$-$C_{18}$ alkyl groups, and in one aspect, $C_1$-$C_6$ alkyl groups.

As used herein, unless otherwise specified, the term "aryl" is intended to include $C_3$-$C_{12}$ aryl groups. The term "aryl" refers to both carbocyclic and heterocyclic aryl groups.

As used herein, the term "alkaryl" refers to any alkyl-substituted aryl substituents and aryl-substituted alkyl substituents. More specifically, the term is intended to refer to $C_{7-16}$ alkyl-substituted aryl substituents and $C_{7-16}$ aryl-substituted alkyl substituents which may or may not comprise additional substituents.

As used herein, the term "detergent composition" is a sub-set of laundry care composition and includes cleaning compositions including but not limited to products for laundering fabrics. Such compositions may be pre-treatment composition for use prior to a washing step or may be rinse added compositions, as well as cleaning auxiliaries, such as bleach additives and "stain-stick" or pre-treat types.

As used herein, the term "laundry care composition" includes, unless otherwise indicated, granular, powder, liquid, gel, paste, unit dose, bar form and/or flake type washing agents and/or fabric treatment compositions, including but not limited to products for laundering fabrics, fabric softening compositions, fabric enhancing compositions, fabric freshening compositions, and other products for the care and maintenance of fabrics, and combinations thereof. Such compositions may be pre-treatment compositions for use prior to a washing step or may be rinse added compositions, as well as cleaning auxiliaries, such as bleach additives and/or "stain-stick" or pre-treat compositions or substrate-laden products such as dryer added sheets.

As used herein, the term "leuco" (as used in reference to, for example, a compound, moiety, radical, dye, monomer, fragment, or polymer) refers to an entity (e.g., organic compound or portion thereof) that, upon exposure to specific chemical or physical triggers, undergoes one or more chemical and/or physical changes that results in a shift from a first color state (e.g., uncolored or substantially colorless) to a second colored state (more highly colored). Suitable chemical or physical triggers include, but are not limited to, oxidation, pH change, temperature change, and changes in electromagnetic radiation (e.g., light) exposure. Suitable chemical or physical changes that occur in the leuco entity include, but are not limited to, oxidation and non-oxidative changes, such as intramolecular cyclization. Thus, in one aspect, a suitable leuco entity can be a reversibly reduced form of a chromophore. In one aspect, the leuco moiety preferably comprises at least a first and a second π-system capable of being converted into a third combined conjugated π-system incorporating said first and second π-systems upon exposure to one or more of the chemical and/or physical triggers described above.

As used herein, the terms "leuco composition", or "leuco colorant composition" refers to a composition comprising at least two leuco colorant compounds having independently selected structures as described in further detail herein.

As used herein "average molecular weight" of the leuco colorant is reported as a weight average molecular weight, as determined by its molecular weight distribution: as a consequence of their manufacturing process, the leuco colorants disclosed herein may contain a distribution of repeating units in their polymeric moiety.

As used herein, the terms "maximum extinction coefficient" and "maximum molar extinction coefficient" are intended to describe the molar extinction coefficient at the wavelength of maximum absorption (also referred to herein as the maximum wavelength), in the range of 400 nanometers to 750 nanometers.

As used herein, the term "converting agent" refers to any oxidizing agent as known in the art other than molecular oxygen in any of its known forms (singlet and triplet states).

As used herein, the term "triggering agent" refers to a reactant suitable for converting the leuco composition from a colorless or substantially colorless state to a colored state.

As used herein, the term "whitening agent" refers to a dye or a leuco colorant that may form a dye once triggered that when on white cotton provides a hue to the cloth with a relative hue angle of 210 to 345, or even a relative hue angle of 240 to 320, or even a relative hue angle of 250 to 300 (e.g., 250 to 290).

As used herein, "cellulosic substrates" are intended to include any substrate which comprises at least a majority by weight of cellulose. Cellulose may be found in wood, cotton, linen, jute, and hemp. Cellulosic substrates may be in the form of powders, fibers, pulp and articles formed from powders, fibers and pulp. Cellulosic fibers, include, without limitation, cotton, rayon (regenerated cellulose), acetate (cellulose acetate), triacetate (cellulose triacetate), and mixtures thereof. Articles formed from cellulosic fibers include textile articles such as fabrics. Articles formed from pulp include paper.

As used herein, articles such as "a" and "an" when used in a claim, are understood to mean one or more of what is claimed or described.

As used herein, the terms "include/s" and "including" are meant to be non-limiting.

As used herein, the term "solid" includes granular, powder, bar and tablet product forms.

As used herein, the term "fluid" includes liquid, gel, paste and gas product forms.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

Particles

An apparatus 1 for forming particles is shown in FIG. 1. The raw material or raw materials can be provided to a batch mixer 10. The batch mixer 10 can have sufficient capacity to retain the volume of raw materials provided thereto for a sufficient residence time to permit the desired level of mixing and or reaction of the raw materials. The material leaving the batch mixer 10 can be the precursor material 20. Optionally, the precursor material can be provided to the feed pipe 40 from some other upstream mixing process, for example in-line mixing, in-line static mixing, and the like. The precursor material 20 can be a molten product. The batch mixer 10 can be a dynamic mixer. A dynamic mixer is a mixer to which energy is applied to mix the contents in the mixer. The batch mixer 10 can comprise one or more impellers to mix the contents in the batch mixer 10.

Between the batch mixer 10, which is optionally present, and the distributor 30, the precursor material 20 can be transported through the feed pipe 40. The feed pipe 40 can be in fluid communication with the batch mixer 10. A gas feed line 155 can be provided in fluid communication with the feed pipe 40 downstream of the batch mixer 10. A gas feed line 155 can be provided in fluid communication with the feed pipe 40 between the batch mixer 10 and the distributor 30. A mill 200 can be provided downstream of the gas feed line 155 and in line with the feed pipe 40. The mill 200 can be provided in line with the feed pipe 40 downstream of the gas feed line 155 and upstream of the distributor 30.

The precursor material 20 can be provided to the feed pipe 40. The feed pipe 40 is the conveyance by which the precursor material 20 is carried. The feed pipe 40 includes the conveyance between elements of the apparatus 1 and the conveyance through which the precursor material is carried within components of the apparatus 1. For instance, the mill 200 may be provided in a unit with a portion of the conveyance approaching the mill 200 and a portion of the conveyance exiting the mill 200. Each of these portions is part of the feed pipe 40. So, the feed pipe 40 can be viewed the entire conveyance between the batch mixer 10 and the distributor 30 and the feed pipe 40 is interrupted by various elements such as the gas feed line 155, the mill 200, intermediate mixer 50, and feed pump 140. In absence of a batch mixer 10 upstream of the feed pipe 40, the feed pipe 40 can be viewed the entire conveyance upstream of the distributor 30 and the feed pipe 40 is interrupted by various elements such as the gas feed line 155, the mill 200, intermediate mixer 50, and feed pump 140.

An intermediate mixer 55 can be provided downstream of the mill 200 and in line with feed pipe 40. The intermediate mixer 55 can be in fluid communication with the feed pipe 40 between the mill 200 and the distributor 30. The intermediate mixer 55, which can be a static mixer 50, can be downstream of the batch mixer 10. Stated otherwise, the batch mixer 10 can be upstream of the intermediate mixer 55 or static mixer 50 if employed. The intermediate mixer 55 can be in-line with the feed pipe 40. The intermediate mixer 55 can be a rotor-stator mixer. The intermediate mixer 55 can be a colloid mill. The intermediate mixer 55 can be a driven in-line fluid disperser. The intermediate mixer 55 can be an Ultra Turrax disperser, Dispax-reactor disperser, Colloid Mil MK, or Cone Mill MKO, available from IKA, Wilmington, N.C., United States of America. The intermediate mixer 55 can be a perforated disc mill, toothed colloid mill, or DIL Inline Homogenizer, available from FrymaKoruma, Rheinfelden, Switzerland. The static mixer 50 can be a helical static mixer. The static mixer 50 can be a Kenics 1.905 cm inside diameter KMS 6, available from Chemineer, Dayton, Ohio, USA.

Without being bound by theory, it is believed that an intermediate mixer 55, such as the static mixer 50, can provide for a more uniform temperature of the precursor material 20 within the distributor 30 or stator 100. At the downstream end of the intermediate mixer 55, or static mixer 50 if used, the temperature of the precursor material 20 within the feed pipe 40 across a cross section of the feed pipe 40 can vary by less than about 10° C., or less than about 5° C., or less than about 1° C., or less than about 0.5° C.

In absence of a static mixer 50, the temperature across a cross section of the feed pipe 40 may be non-uniform. The temperature of the precursor material 20 at the center line of the feed pipe 40 may be higher than the temperature of the precursor feed material 20 at the peripheral wall of the feed pipe 40. When the precursor material 20 is discharged to the distributor 30 or stator 100, the temperature of the precursor material 20 may vary at different positions within the distributor or stator 100. Without being bound by theory, it is thought that by providing for a uniform temperature across the cross section of the feed pipe 40 by employing a static mixer 40 as described herein, more uniform particles 90 can be produced as compared to an apparatus 1 that does not have a static mixer 40.

The distributor 30 can be provided with a plurality of apertures 60. The precursor material 20 can be passed through the apertures 60. After passing through the apertures 60, the precursor material 20 can be deposited on a moving conveyor 80 that is provided beneath the distributor 30. The precursor material 20 can be deposited on the moving conveyor 80 when the conveyor 80 is in motion. The conveyor 80 can be moveable in translation relative to the distributor 30. The conveyor 80 can be a continuously moving conveyor 80. The conveyor 80 can be an intermittently moving conveyor 80. A continuously moving conveyor 80 may provide for higher processing speeds. An intermittently moving conveyor 80 can provide for improved control of the shape of the particles 90 that are produced.

The precursor material 20 can be cooled on the moving conveyor 80 to form a plurality of solid particles 90. The cooling can be provided by ambient cooling. Optionally the cooling can be provided by spraying the under-side of the conveyor 80 with ambient temperature water or chilled water.

Once the particles 90 are sufficiently coherent, the particles 90 can be transferred from the conveyor 80 to processing equipment downstream of the conveyor 80 for further processing and or packaging.

Figure 2:
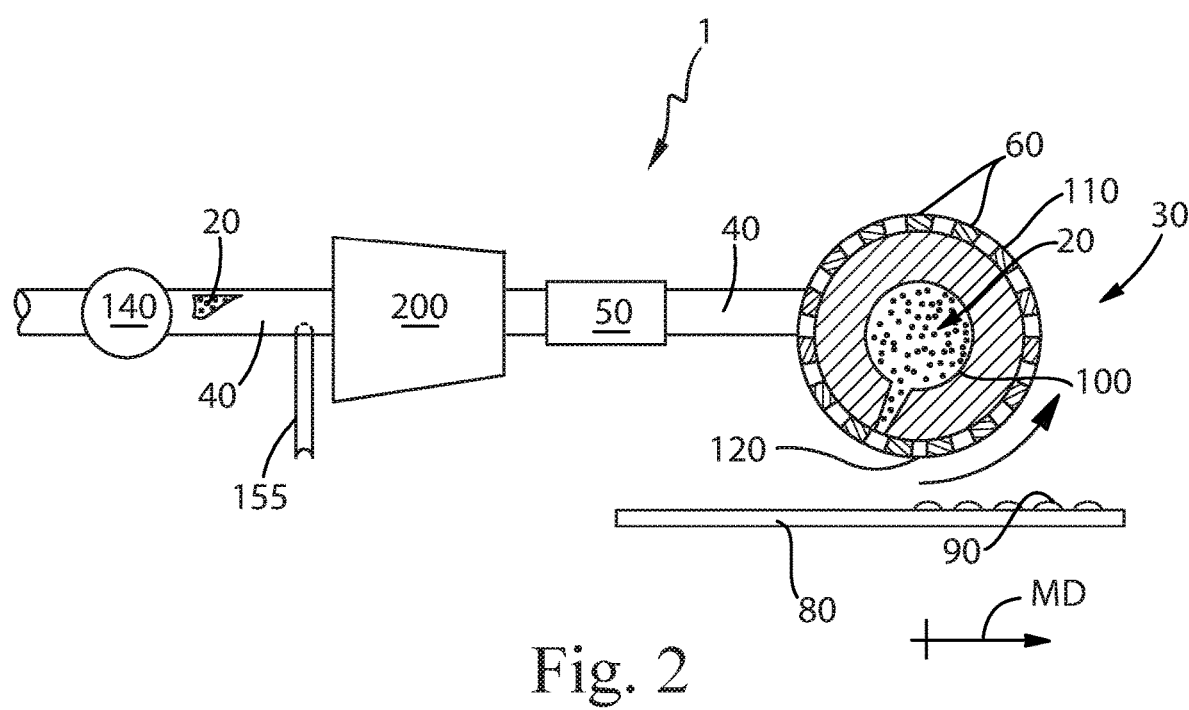
FIG. 2 is a portion of an apparatus.

The distributor 30 can be a cylinder 110 rotationally mounted about a stator 100 with the stator being in fluid communication with the feed pipe 40 and the cylinder 110 can have a periphery 120 and there can be a plurality of apertures 60 in the periphery 120, as shown in FIG. 2. So, the apparatus 1 can comprise a stator 100 in fluid communication with the feed pipe 40. The feed pipe 40 can feed the precursor material 20 to the stator 100 after the precursor material 20 has passed through the mill 200.

The apparatus 1 can comprise a cylinder 110 rotationally mounted about the stator 100. The stator 100 is fed precursor material through one or both ends 130 of the cylinder 110. The cylinder 110 can have a longitudinal axis L passing through the cylinder 110 about which the cylinder 110 rotates. The cylinder 110 has a periphery 120. There can be a plurality of apertures 60 in the periphery 120 of the cylinder 110.

As the cylinder 110 is driven to rotate about its longitudinal axis L, the apertures 60 can be intermittently in fluid communication with the stator 100 as the cylinder 110 rotates about the stator 100. The cylinder 110 can be considered to have a machine direction MD in a direction of movement of the periphery 120 across the stator 100 and a cross machine direction on the periphery 120 orthogonal to the machine direction MD. The stator 100 can similarly be considered to have a cross machine direction CD parallel to the longitudinal axis L. The cross machine direction of the stator 100 can be aligned with the cross machine direction of the cylinder 110. The stator 100 can have a plurality of distribution ports 120 arranged in a cross machine direction CD of the stator 100. The distribution ports 120 are portions or zones of the stator 100 supplied with precursor material 20.

In general, precursor material 20 can be fed past the gas feed line 155 through the mill 200 and feed pipe 40 to the stator 100. The stator 100 distributes the precursor feed material 20 across the operating width of the cylinder 110. As the cylinder 110 rotates about its longitudinal axis, precursor material 20 is fed through the apertures 60 as the apertures 60 pass by the stator 100. A discrete mass of precursor material 20 is fed through each aperture 60 as each aperture 60 encounters the stator 100. The mass of precursor material 20 fed through each aperture 60 as each aperture 60 passes by the stator 100 can be controlled by controlling one or both of the pressure of the precursor material within the stator 100 and the rotational velocity of the cylinder 110.

Drops of the precursor material 20 are deposited on the conveyor 80 across the operating width of the cylinder 110. The conveyor 80 can be moveable in translation relative to the longitudinal axis of the cylinder 110. The velocity of the conveyor 80 can be set relative to the tangential velocity of the cylinder 110 to control the shape that the precursor material 20 has once it is deposited on the conveyor 80. The velocity of the conveyor 80 can be the about the same as the tangential velocity of the cylinder 110.

As shown in FIG. 1, flow of the precursor material 20 through the feed pipe 40 can be provided by gravity driven flow from a batch mixer 10 and the distributor 30. To provide for more controllable manufacturing, the apparatus 1 can be provided with a feed pump 140, as shown in FIG. 2. The feed pump 140 can be in line with the feed pipe 40, with in line meaning in the line of flow of the precursor material 20. The feed pump 140 can between the batch mixer 10 and the distributor 30. The feed pump 140 can be upstream of the distributor 30. If a stator 100 is employed, the feed pump 140 can be in line with the feed pipe 40, with in line meaning in the line of flow of the precursor material 20. If a stator 100 is employed, the feed pump 140 can be between the batch mixer 10 and the stator 100. The feed pump 140 can be upstream of the stator 100. In describing the position of the feed pump 140, between is used to describe the feed pump 140 being in-line downstream of the batch mixer 10 and upstream of the distributor 30 or if used, upstream of the stator 100.

The gas feed line 155 and the mill 200 can be positioned in line between the feed pump 140 and the distributor 30 or stator 100, if employed in the apparatus 1.

The gas feed line 155 can comprise a flow regulator 158. The flow regulator 158 can regulate the flow of gas into the feed line 40. The volume of gas added per unit volume of precursor material 20 can be controlled by setting the flow regulator 158 to the desired flow. The more gas fed into the precursor material 20 within the feed line 40, the more gas that will be contained in the particles 90. The gas feed line 155 can provide for entraining gas into the precursor material 20.

The flow regulator 158 can be Key Instruments Flo-Rite Series GS 65 mm flowmeter, part number 60410-R5. The feed line 40 can be a 1½" stainless steel sanitary pipe. The gas feed line 155 can be ¼" inside diameter polyethylene tubing. Gas can be provided in the gas feed line 155 at a pressure of about 85 psi.

The flow rate of the precursor material 20 can be about 3 L/min. The precursor material 20 can be a molten material comprising any of the compositions described herein for the precursor material 20 or particles 90.

The gas provided in the gas feed line 155 can be air. Air can be practical in that it is readily available, low cost, and the chemical interactions with constituents of the particles 90 are well understood.

The gas provided in the gas feed line 155 can be an inert gas. An inert gas can be practical in that particles 90 entrained with an inert gas may be less susceptible to degradation as compared to particles 90 entrained with air.

The gas provided in the gas feed line 155 can be selected from the group consisting of air, oxygen, nitrogen, carbon dioxide, argon, and mixtures thereof. Such gasses are widely available and commonly used in commercial applications. Without being bound by theory, such gasses might improve the stability of the product.

The gas can be provided at a temperature such that when the gas reaches ambient temperature the desired volume of gas is present in the particles 90. The Ideal Gas Law can be used to determine the desired temperature of delivery. The gas can also comprise water. The water can be in gaseous or liquid form. The quantity of water in the gas can be selected to be at the desired level.

Optionally gas can be entrained in the precursor material by mixing a gas generating material in the precursor material 20.

The mill 200 can be a rotor-stator type mill. The mill can be a Quadro Z1 in-line mixer with a single stage of medium rotor stators, operated at about 400 RPM.

The mill 200 and gas feed line 155 can be combined in a single unit.

An Oakes Foamer (E.T. Oakes Corporation, 686 Old Willets Path, Hauppauge, N.Y. 11788) 2MT1A continuous foamer) can be used to provide the gas feed line 155, flow regulator 158 and mill 200 in a single unit.

Figure 3:
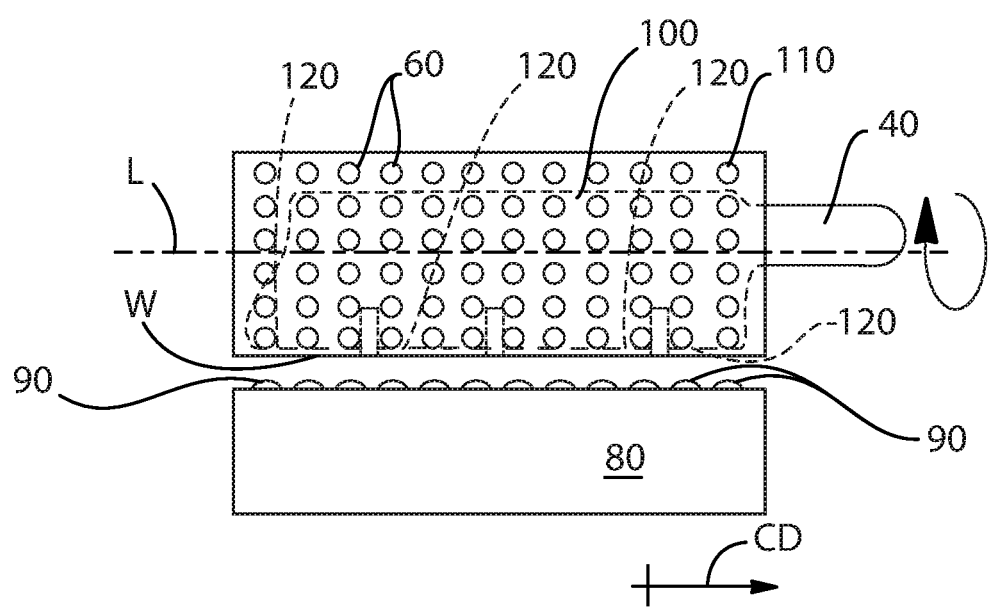
FIG. 3 is an end view an apparatus.

A view of an apparatus 1 in the machine direction MD is shown in FIG. 3. As shown in FIG. 3, the apparatus 1 can have an operating width W and the cylinder 110 can rotate about longitudinal axis L.

The apparatus 1 for forming particles 90 can comprise: a feed pipe; a gas feed line 155 mounted in fluid communication with the feed pipe 40 downstream of the batch mixer 10; a mill 200 downstream of the gas feed line 155 and in line with the feed pipe 40; and a distributor 30 downstream of the mill 200 and fluid communication with said feed pipe 40, wherein said distributor 30 comprises a plurality of apertures 60. The apparatus 1 can comprise a conveyor beneath the distributor 30 and movable in translation relative to the distributor 30. The distributor 30 can comprise a stator 100 in fluid communication with the feed pipe 40. The distributor 30 can comprise a cylinder 110 rotationally mounted about the stator 100 and rotatable about a longitudinal axis L of the cylinder 110. The cylinder 110 can have a periphery 120 and the cylinder 110 can have a plurality of apertures 60 disposed about the periphery 120. The apertures 60 can be intermittently in fluid communication with the stator 100 as the cylinder 110 rotates about the stator 100. The apparatus can comprise a conveyor 80 beneath the cylinder 110 and the conveyor 80 can be movable in translation relative to the longitudinal axis L. The apparatus 1 for forming particles 90 can comprise a batch mixer 10. The feed pipe 40 can be in fluid communication with the batch mixer 10.

The process for forming particles 90 can comprise the steps of: providing a precursor material 20 to a feed pipe 40; providing the precursor material 20 to the feed pipe 40; entraining gas into the precursor material 20, providing a stator 100 in fluid communication with the feed pipe 40; distributing the precursor material 20 to the stator 100; providing a cylinder 110 rotating about the stator 100 and rotatable about a longitudinal axis L of the cylinder 110, wherein the cylinder 110 has a periphery 120 and a plurality of apertures 60 disposed about the periphery 120; passing the precursor material 120 through the apertures 60; providing a moving conveyor 80 beneath the cylinder 110; depositing the precursor material 20 onto the moving conveyor 80; and cooling the precursor material 20 to form a plurality of particles 90. The process can be implemented using any of the apparatuses disclosed herein. The process can employ any of the precursor materials 20 disclosed herein to form any of the particles 90 disclosed herein. The process can comprise the step of providing a precursor material 20 in a batch mixer 10 in fluid communication with the feed pipe.

The process for forming particles 90 can comprise the steps of: providing a precursor material 20 to a feed pipe 40; providing the precursor material 20 to the feed pipe 40; entraining gas into the precursor material 20; providing a distributor 30 having a plurality of apertures 60; transporting the precursor material 20 from the feed pipe 40 to the distributor 30; passing the precursor material 20 through the apertures 60; providing a moving conveyor 80 beneath the distributor 30; depositing the precursor material 20 on to the moving conveyor 80; and cooling the precursor material 20 to form a plurality of particles 90. The precursor material 20 can comprises more than about 40% by weight polyethylene glycol having a weight average molecular weight from about 2000 to about 13000 and from about 0.0001% to about 50% by weight leuco colorant, or, preferably, from 0.001% to about 25% by weight leuco colorant as disclosed herein. The process can be implemented using any of the apparatuses disclosed herein. The process can employ any of the additional precursor materials 20 disclosed herein to form any of the particles 90 disclosed herein. The process can comprise the step of providing a precursor material 20 in a batch mixer 10 in fluid communication with the feed pipe.

The precursor material 20 can be any composition that can be processed as a molten material that can be formed into the particles 90 using the apparatus 1 and method described herein. The composition of the precursor material 20 is governed by what benefits will be provided with the particles 90. The precursor material 20 can be a raw material composition, industrial composition, consumer composition, or any other composition that can advantageously be provided in a particulate form.

The precursor material 20 and particles 90 can be incorporated into a fabric detergent composition, as known in the art. When incorporated into a fabric detergent, the fabric detergent may also include from about 0.001% to less than about 90% typical fabric care adjuncts, as known in the art, including surfactants, builders, chelating agents, dye transfer inhibiting agents, dispersants, enzymes, and enzyme stabilizers, plasticizing solvents, catalytic materials, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids and/or pigments and mixtures thereof. When the precursor material 20 and particles 90 are not incorporated into a fabric detergent composition, any typical fabric care adjuncts, as known in the art, may be co-incorporated along with the leuco colorant into the precursor material 20 and particles 90 according to the desired benefits to be delivered. For example, in order to protect the leuco colorant or any traditional aesthetic or shading dyes, which may be included in the composition, from degradation, anti-oxidants, UV absorbing compounds and the like may be co-incorporated. Moreover, for aesthetic purposes, other dyes may be incorporated both in particles that comprise leuco colorant and in particles that do not comprise leuco colorant. Perfumes that may be incompatible can be incorporated in the laundry care composition by placing those perfumes into particles that do not comprise leuco colorant, or only comprise very low levels. As will be understood by those skilled in the art, these are merely examples of the ways in which the ordinarily skilled artisan may construct the laundry care composition in order to maximize the intended benefit and are not meant to be limiting.

The precursor material 20 and particles 90 can comprise a carrier and any combination of leuco colorant, shading dye, aesthetic dye, perfume, and occlusions of gas. The occlusions of gas can be spherical occlusions of gas.

Carrier

The carrier can be or comprise a material selected from the group consisting of water soluble inorganic alkali metal salt, water-soluble alkaline earth metal salt, water-soluble organic alkali metal salt, water-soluble organic alkaline earth metal salt, water soluble carbohydrate, water-soluble silicate, water soluble urea, and any combination thereof. Alkali metal salts can be, for example, selected from the group consisting of salts of lithium, salts of sodium, and salts of potassium, and any combination thereof. Useful alkali metal salts can be, for example, selected from the group consisting of alkali metal fluorides, alkali metal chlorides, alkali metal bromides, alkali metal iodides, alkali metal sulfates, alkali metal bisulfates, alkali metal phosphates, alkali metal monohydrogen phosphates, alkali metal dihydrogen phosphates, alkali metal carbonates, alkali metal monohydrogen carbonates, alkali metal acetates, alkali metal citrates, alkali metal lactates, alkali metal pyruvates, alkali metal silicates, alkali metal ascorbates, and combinations thereof.

Alkali metal salts can be selected from the group consisting of, sodium fluoride, sodium chloride, sodium bromide, sodium iodide, sodium sulfate, sodium bisulfate, sodium phosphate, sodium monohydrogen phosphate, sodium dihydrogen phosphate, sodium carbonate, sodium hydrogen carbonate, sodium acetate, sodium citrate, sodium lactate, sodium tartrate, sodium silicate, sodium ascorbate, potassium fluoride, potassium chloride, potassium bromide, potassium iodide, potassium sulfate, potassium bisulfate, potassium phosphate, potassium monohydrogen phosphate, potassium dihydrogen phosphate, potassium carbonate, potassium monohydrogen carbonate, potassium acetate, potassium citrate, potassium lactate, potassium tartrate, potassium silicate, potassium, ascorbate, and combinations thereof. Alkaline earth metal salts can be selected from the group consisting of salts of magnesium, salts of calcium, and the like, and combinations thereof. Alkaline earth metal salts can be selected from the group consisting of alkaline metal fluorides, alkaline metal chlorides, alkaline metal bromides, alkaline metal iodides, alkaline metal sulfates, alkaline metal bisulfates, alkaline metal phosphates, alkaline metal monohydrogen phosphates, alkaline metal dihydrogen phosphates, alkaline metal carbonates, alkaline metal monohydrogen carbonates, alkaline metal acetates, alkaline metal citrates, alkaline metal lactates, alkaline metal pyruvates, alkaline metal silicates, alkaline metal ascorbates, and combinations thereof. Alkaline earth metal salts can be selected from the group consisting of magnesium fluoride, magnesium chloride, magnesium bromide, magnesium iodide, magnesium sulfate, magnesium phosphate, magnesium monohydrogen phosphate, magnesium dihydrogen phosphate, magnesium carbonate, magnesium monohydrogen carbonate, magnesium acetate, magnesium citrate, magnesium lactate, magnesium tartrate, magnesium silicate, magnesium ascorbate, calcium fluoride, calcium chloride, calcium bromide, calcium iodide, calcium sulfate, calcium phosphate, calcium monohydrogen phosphate, calcium dihydrogen phosphate, calcium carbonate, calcium monohydrogen carbonate, calcium acetate, calcium citrate, calcium lactate, calcium tartrate, calcium silicate, calcium ascorbate, and combinations thereof. Inorganic salts, such as inorganic alkali metal salts and inorganic alkaline earth metal salts, do not contain carbon. Organic salts, such as organic alkali metal salts and organic alkaline earth metal salts, contain carbon. The organic salt can be an alkali metal salt or an alkaline earth metal salt of sorbic acid (i.e., asorbate). Sorbates can be selected from the group consisting of sodium sorbate, potassium sorbate, magnesium sorbate, calcium sorbate, and combinations thereof.

The carrier can be or comprise a material selected from the group consisting of a water-soluble inorganic alkali metal salt, a water-soluble organic alkali metal salt, a water-soluble inorganic alkaline earth metal salt, a water-soluble organic alkaline earth metal salt, a water-soluble carbohydrate, a water-soluble silicate, a water-soluble urea, and combinations thereof. The carrier or water soluble-soluble carrier can be selected from the group consisting of sodium chloride, potassium chloride, calcium chloride, magnesium chloride, sodium sulfate, potassium sulfate, magnesium sulfate, sodium carbonate, potassium carbonate, sodium hydrogen carbonate, potassium hydrogen carbonate, sodium acetate, potassium acetate, sodium citrate, potassium citrate, sodium tartrate, potassium tartrate, potassium sodium tartrate, calcium lactate, water glass, sodium silicate, potassium silicate, dextrose, fructose, galactose, isoglucose, glucose, sucrose, raffinose, isomalt, xylitol, candy sugar, coarse sugar, and combinations thereof. In one embodiment, the carrier or water-soluble carrier can be sodium chloride. In one embodiment, the carrier or water-soluble carrier can be table salt.

The carrier can be or comprise a material selected from the group consisting of sodium bicarbonate, sodium sulfate, sodium carbonate, sodium formate, calcium formate, sodium chloride, sucrose, maltodextrin, corn syrup solids, corn starch, wheat starch, rice starch, potato starch, tapioca starch, clay, silicate, citric acid carboxymethyl cellulose, fatty acid, fatty alcohol, glyceryl diester of hydrogenated tallow, glycerol, and combinations thereof.

The carrier can be selected from the group consisting of water soluble organic alkali metal salt, water soluble inorganic alkaline earth metal salt, water soluble organic alkaline earth metal salt, water soluble carbohydrate, water soluble silicate, water soluble urea, starch, clay, water insoluble silicate, citric acid carboxymethyl cellulose, fatty acid, fatty alcohol, glyceryl diester of hydrogenated tallow, glycerol, polyethylene glycol, polyvinyl alcohol and combinations thereof.

The particles 90 can comprise from about 20% by weight to about 99.9% by weight of the particles 90 of the carrier. The carrier can be polyethylene glycol.

The precursor material 20, and thereby the particles 90, can comprise more than about 20% by weight polyethylene glycol having a weight average molecular weight from about 2000 to about 13000. Polyethylene glycol (PEG) has a relatively low cost, may be formed into many different shapes and sizes, minimizes diffusion of small molecules such as some leuco colorants or unencapsulated perfumes, and dissolves well in water. PEG comes in various weight average molecular weights. A suitable weight average molecular weight range of PEG includes from about 2,000 to about 13,000, from about 4,000 to about 12,000, alternatively from about 5,000 to about 11,000, alternatively from about 6,000 to about 10,000, alternatively from about 7,000 to about 9,000, alternatively combinations thereof. PEG is available from BASF, for example PLURIOL E 8000.

The precursor material 20, and thereby the particles 90, can comprise more than about 20% by weight of the particles of PEG. The precursor material 20, and thereby the particles 90, can comprise more than about 40% by weight of the particles of PEG. The precursor material 20, and thereby the particles 90, can comprise more than about 60% by weight of the particles of PEG. The precursor material 20, and thereby the particles 90, may comprise from about 65% to about 99.9% by weight of the composition of PEG. The precursor material 20, and thereby the particles 90, may comprise from about 20% to about 99.9% by weight of the composition of PEG.

Alternatively, the precursor material 20, and thereby the particles 90, can comprise from about 20% to less than about 99.9%, alternatively from about 45% to about 90%, alternatively from about 60% to about 80%, alternatively combinations thereof and any whole percentages or ranges of whole percentages within any of the aforementioned ranges, of PEG by weight of the precursor material 20, and thereby the particles 90.

Depending on the application, the precursor material 20, and thereby the particles 90, can comprise from about 0.5% to about 5% by weight of the particles of a balancing agent selected from the group consisting of glycerin, polypropylene glycol, isopropyl myristate, dipropylene glycol, 1,2-propanediol, and PEG having a weight average molecular weight less than 2,000, and mixtures thereof.

The precursor material 20, and thereby the particles 90, can comprise an antioxidant. The antioxidant can help to promote stability of the color and or odor of the particles over time between production and use. The precursor material 20, and thereby particles 90, can comprise between about 0.01% to about 1% by weight antioxidant. The precursor material 20, and thereby particles 90, can comprise between about 0.001% to about 2% by weight antioxidant.

The precursor material 20, and thereby particles 90, can comprise between about 0.01% to about 0.1% by weight antioxidant. The antioxidant can be butylated hydroxytoluene.

Anti-Oxidant

The laundry care composition may optionally contain an anti-oxidant present from about 0.001 to about 2% by weight. Preferably the antioxidant is present at a concentration in the range 0.01 to 0.1% by weight. Mixtures of anti-oxidants may be used and in some embodiments, may be preferred.

Anti-oxidants are substances as described in Kirk-Othmer (Vol. 3, page 424) and in Ullmann's Encyclopedia (Vol. 3, page 91).

One class of anti-oxidants used in the present invention is alkylated phenols, having the general formula:

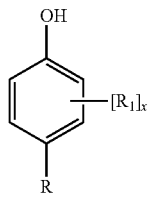

wherein R is $C_1$-$C_{22}$ linear or branched alkyl, preferably methyl or branched $C_3$-$C_6$ alkyl, $C_1$-$C_6$ alkoxy, preferably methoxy, or —$CH_2CH_2C(O)OR'$, wherein R' is H, a charge balancing counterion or $C_1$-$C_{22}$ linear or branched alkyl; $R_1$ is a $C_3$-$C_6$ branched alkyl, preferably tert-butyl; x is 1 or 2. Hindered phenolic compounds are a preferred type of alkylated phenols having this formula. A preferred hindered phenolic compound of this type is 3,5-di-tert-butyl-4-hydroxytoluene (BHT).

Furthermore, the anti-oxidant used in the composition may be selected from the group consisting of α-, β-, γ-, δ-tocopherol, ethoxyquin, 2,2,4-trimethyl-1,2-dihydroquinoline, 2,6-di-tert-butyl hydroquinone, tert-butyl hydroxyanisole, lignosulphonic acid and salts thereof, and mixtures thereof. It is noted that ethoxyquin (1,2-dihydro-6-ethoxy-2,2,4-trimethylquinoline) is marketed under the name Raluquin™ by the company Raschig™.

Other types of anti-oxidants that may be used in the composition are 6-hydroxy-2,5,7,8-tetramethylchroman-2-carboxylic acid (Trolox™) and 1,2-benzisothiazoline-3-one (Proxel GXL™).

A further class of anti-oxidants which may be suitable for use in the composition is a benzofuran or benzopyran derivative having the formula:

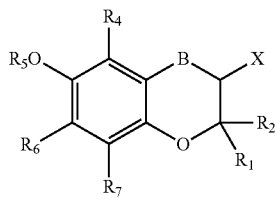

wherein $R_1$ and $R_2$ are each independently alkyl or $R_1$ and $R_2$ can be taken together to form a $C_5$-$C_6$ cyclic hydrocarbyl moiety; B is absent or $CH_2$; $R_4$ is $C_1$-$C_6$ alkyl; $R_5$ is hydrogen or —$C(O)R_3$ wherein $R_3$ is hydrogen or $C_1$-$C_{19}$ alkyl; $R_6$ is $C_1$-$C_6$ alkyl; $R_7$ is hydrogen or $C_1$-$C_6$ alkyl; X is —$CH_2OH$, or —$CH_2A$ wherein A is a nitrogen comprising unit, phenyl, or substituted phenyl. Preferred nitrogen comprising A units include amino, pyrrolidino, piperidino, morpholino, piperazino, and mixtures thereof.

Anti-oxidants such as tocopherol sorbate, butylated hydroxyl benxoic acids and their salts, gallic acid and its alkyl esters, uric acid and its salts, sorbic acid and its salts, and dihydroxyfumaric acid and its salts may also be used. In one aspect, the most preferred types of anti-oxidant for use in the composition are 3,5-di-tert-butyl-4-hydroxytoluene (BHT), α-, β-, γ-, δ-tocopherol, 1,2-benzisothiazoline-3-one (Proxel GXL™) and mixtures thereof. In another aspect, the most preferred types of anti-oxidant for use in the composition are hindered phenols, diarylamines (including phenoxazines with a maximum molar extinction coefficient in the wavelength range from 400 to 750 nm of less than 1,000 $M^{-1}$ $cm^{-1}$), and mixtures thereof. In preferred mixtures, the number of equivalents of hindered phenol initially formulated will normally be greater than or equal to the number of equivalents of diarylamine.

Leuco Colorant

The precursor material 20 and particles 90 may comprise a leuco colorant. Preferably, at least about 0.0001%, 0.01%, 0.1%, 1%, 10%, 30%, 50%, 70%, 90%, or even about 95% of the particles 90 comprises leuco colorant.

The leuco colorant (sometimes referred to as a leuco dye) once converted to its second colored state typically provides a blue or violet shade to fabric. Leuco colorants can be used either alone or in combination with either traditional shading dyes or other leuco colorants to create a specific shade of hueing and/or to shade different fabric types. This may be provided for example by mixing a red and green-blue dye to yield a blue or violet shade. Preferably the shading dye or second colored state of the leuco colorant is a blue or violet dye, providing a blue or violet color to a white cloth or fabric. Such a white cloth treated with the laundry care composition will have a hue angle of 210 to 345, more preferably 240 to 345, more preferably 260 to 325, even more preferably 270 to 310.

In one aspect, the molar extinction coefficient of said second colored state at the maximum absorbance in the wavelength in the range 200 to 1,000 nm (more preferably 400 to 750 nm) is preferably at least five times, more preferably 10 times, even more preferably 25 times, most preferably at least 50 times the molar extinction coefficient of said first color state at the wavelength of the maximum absorbance of the second colored state. Preferably, the molar extinction coefficient of said second colored state at the maximum absorbance in the wavelength in the range 200 to 1,000 nm (more preferably 400 to 750 nm) is at least five times, preferably 10 times, even more preferably 25 times, most preferably at least 50 times the maximum molar extinction coefficient of said first color state in the corresponding wavelength range. An ordinarily skilled artisan will realize that these ratios may be much higher. For example, the first color state may have a maximum molar extinction coefficient in the wavelength range from 400 to 750 nm of as little as 10 $M^{-1}$ $cm^{-1}$, and the second colored state may have a maximum molar extinction coefficient in the wavelength range from 400 to 750 nm of as much as 80,000 $M^{-1}$ $cm^{-1}$ or more, in which case the ratio of the extinction coefficients would be 8,000:1 or more.

In one aspect, the maximum molar extinction coefficient of said first color state at a wavelength in the range 400 to 750 nm is less than 1000 $M^{-1}$ $cm^{-1}$, and the maximum molar extinction coefficient of said second colored state at a wavelength in the range 400 to 750 nm is more than 5,000

$M^{-1}$ cm$^{-1}$, preferably more than 10,000, 25,000, 50,000 or even 100,000 $M^{-1}$ cm$^1$. A skilled artisan will recognize and appreciate that a polymer comprising more than one leuco moiety may have a significantly higher maximum molar extinction coefficient in the first color state (e.g., due to the additive effect of a multiplicity of leuco moieties or the presence of one or more leuco moieties converted to the second colored state).

The range of textile articles encountered in the consumer home is quite large and often comprises garments constructed from a wide variety of both natural and synthetic fibers, as well as mixtures of these either in the same wash load or even in the same garment. The articles can be constructed in a variety of ways and may comprise any of a vast array of finishes that may be applied by the manufacturer. The amount of any such finish remaining on a consumer's textile article depends on a wide array of factors among which are the durability of the finish under the particular washing conditions employed by the consumer, the particular detergents and additives the consumer may have used as well as the number of cycles that the article has been washed. Depending on the history of each article, finishes may be present to varying degrees or essentially absent, while other materials present in the wash or rinse cycles and contaminants encountered during wearing may start to accumulate on the article.

The skilled artisan is keenly aware that any detergent formulation used by consumers will encounter textile articles that represent the full range of possibilities and expects that there not only may be, but in fact will be, significant differences in the way the formulation performs on some textiles articles as opposed to others. When incorporated into the laundry care compositions of the present invention, the leuco colorants have been found to increase the whiteness of consumer aged garments more than they increase the whiteness of new garments from which the finishes have been removed with successive washes. Thus, laundry care compositions comprising such leuco colorants may be preferred over conventional hueing agents, since newer garments typically have less of a yellowing issue whereas older consumer aged garments are more prone to have an issue with yellowing. The leuco colorants employed in the laundry care composition of the instant invention have a bias for increasing the whiteness of aged garments over clean new garments that is larger than the bias displayed by many traditional hueing agents.

In one aspect, the invention relates to a leuco composition selected from the group consisting of a diarylmethane leuco, a triarylmethane leuco, an oxazine leuco, a thiazine leuco, a hydroquinone leuco, an arylaminophenol leuco and mixtures thereof.

Suitable diarylmethane leuco compounds for use herein include, but are not limited to, diarylmethylene derivatives capable of forming a second colored state as described herein. Suitable examples include, but are not limited to, Michler's methane, a diarylmethylene substituted with an —OH group (e.g., Michler's hydrol) and ethers and esters thereof, a diarylmethylene substituted with a photocleavable moiety, such as a —CN group (bis(para-N,N-dimethyl) phenyl)acetonitrile), and similar such compounds.

In one aspect, the invention relates to a composition comprising one or more leuco compounds conforming to the group selected from:

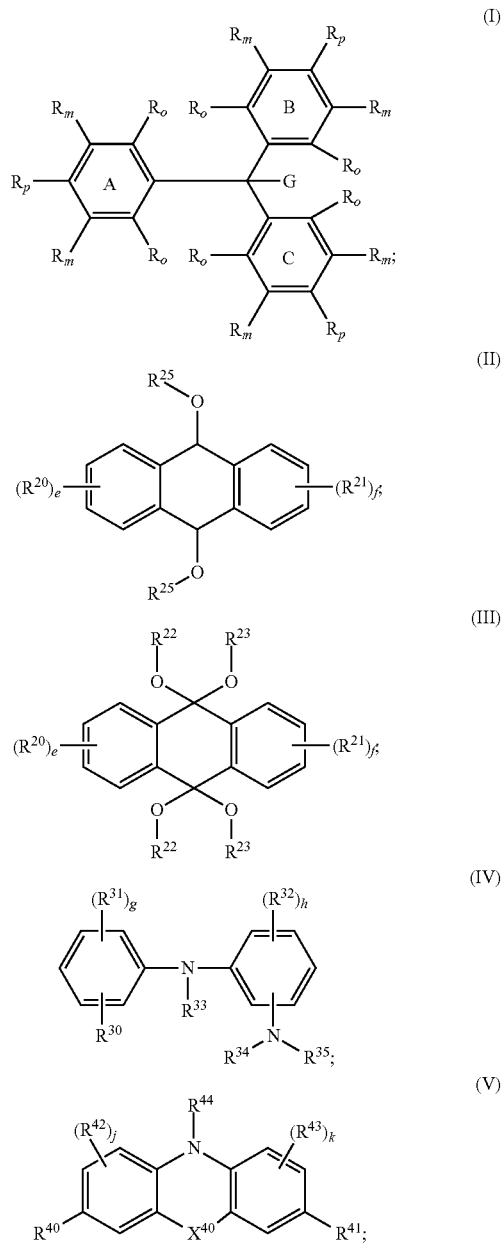

and
(f) mixtures thereof;
wherein the ratio of Formula I-V to its oxidized form is at least 1:19, 1:9, or 1:3, preferably at least 1:1, more preferably at least 3:1, most preferably at least 9:1 or even 19:1.

In the structure of Formula (I), each individual $R_o$, $R_m$ and $R_p$ group on each of rings A, B and C is independently selected from the group consisting of hydrogen, deuterium and $R^5$; each $R^5$ is independently selected from the group consisting of halogens, nitro, alkyl, substituted alkyl, aryl, substituted aryl, alkaryl, substituted alkaryl, —(CH$_2$)$_n$—O—R$^1$, —(CH$_2$)$_n$—NR$^1$R$^2$, —C(O)R$^1$, —C(O)OR$^1$, —C(O)O$^-$, —C(O)NR$^1$R$^2$, —OC(O)R$^1$, —OC(O)OR$^1$, —OC(O)NR$^1$R$^2$, —S(O)$_2$R$^1$, —S(O)$_2$OR$^1$, —S(O)$_2$O—, —S(O)$_2$NR$^1$R$^2$, —NR$^1$C(O)R$^2$, —NR$^1$C(O)OR$^2$, —NR$^1$C(O)SR$^2$, —NR$^1$C(O)NR$^2$R$^3$, —P(O)$_2$R$^1$, —P(O)(OR$^1$)$_2$, —P(O)(OR$^1$)O$^-$, and —P(O)(O$^-$)$_2$; wherein the index n is an integer from 0 to 4, preferably from 0 to 1, most preferably 0; wherein two $R_o$ on different A, B and C rings may combine to form a fused ring of five or more members; when the fused ring is six or more members, two $R_o$ on different A, B and C rings may combine to form an organic linker optionally containing one or more heteroatoms; in one embodiment two $R_o$ on different A, B and C rings combine to form a heteroatom bridge selected from —O— and —S— creating a six member fused ring; an $R_o$ and $R_m$ on the same ring or an $R_m$ and $R_p$ on the same ring may combine to form a fused aliphatic ring or fused aromatic ring either of which may contain heteroatoms; on at least one of the three rings A, B or C, preferably at least two, more preferably at least three, most preferably all four of the $R_o$ and $R_m$ groups are hydrogen, preferably all four $R_o$ and $R_m$ groups on at least two of the rings A, B and C are hydrogen; in some embodiments, all $R_o$ and $R_m$ groups on rings A, B and C are hydrogen; preferably each $R_p$ is independently selected from hydrogen, —$OR^1$ and —$NR^1R^2$; no more than two, preferably no more than one of $R_p$ is hydrogen, preferably none are hydrogen; more preferably at least one, preferably two, most preferably all three $R_p$ are —$NR^1R^2$; in some embodiments, one or even two of the Rings A, B and C may be replaced with an independently selected $C_3$-$C_9$ heteroaryl ring comprising one or two heteroatoms independently selected from O, S and N, optionally substituted with one or more independently selected $R^5$ groups; G is independently selected from the group consisting of hydrogen, deuterium, $C_1$-$C_{16}$ alkoxide, phenoxide, bisphenoxide, nitrite, nitrile, alkyl amine, imidazole, arylamine, polyalkylene oxide, halides, alkylsulfide, aryl sulfide, or phosphine oxide; in one aspect the fraction [(deuterium)/(deuterium+hydrogen)] for G is at least 0.20, preferably at least 0.40, even more preferably at least 0.50 and most preferably at least 0.60 or even at least 0.80; wherein any two of $R^1$, $R^2$ and $R^3$ attached to the same heteroatom can combine to form a ring of five or more members optionally comprising one or more additional heteroatoms selected from the group consisting of —O—, —$NR^{15}$—, and —S—.

In the structure of Formula (II)-(III), e and f are independently integers from 0 to 4; each $R^{20}$ and $R^{21}$ is independently selected from the group consisting of halogens, a nitro group, alkyl groups, substituted alkyl groups, —NC(O)$OR^1$, —NC(O)$SR^1$, —$OR^1$, and —$NR^1R^2$; each $R^{25}$ is independently selected from the group consisting of monosaccharide moiety, disaccharide moiety, oligosaccharide moiety, and polysaccharide moiety, —C(O)$R^1$, —C(O)$OR^1$, —C(O)$NR^1R^2$; each $R^{22}$ and $R^{23}$ is independently selected from the group consisting of hydrogen, alkyl groups, and substituted alkyl groups.

In the structure of Formula (IV), wherein $R^{30}$ is positioned ortho or para to the bridging amine moiety and is selected from the group consisting of —$OR^{38}$ and —$NR^{36}R^{37}$, each $R^{36}$ and $R^{37}$ is independently selected from the group consisting of hydrogen, alkyl groups, substituted alkyl groups, aryl groups, substituted aryl groups, acyl groups, $R^4$, —C(O)$OR^1$, —C(O)$R^1$, and —C(O)$NR^1R^2$; $R^{38}$ is selected from the group consisting of hydrogen, acyl groups, —C(O)$OR^1$, —C(O)$R^1$, and —C(O)$NR^1R^2$; g and h are independently integers from 0 to 4; each $R^{31}$ and $R^{32}$ is independently selected from the group consisting of alkyl groups, substituted alkyl groups, aryl groups, substituted aryl groups, alkaryl, substituted alkaryl, —$(CH_2)_n$—O—$R^1$, —$(CH_2)_n$—$NR^1R^2$, —C(O)$R^1$, —C(O)$OR^1$, —C(O)$O^-$, —C(O)$NR^1R^2$, —OC(O)$R^1$, —OC(O)$OR^1$, —OC(O)$NR^1R^2$, —S(O)$_2R^1$, —S(O)$_2OR^1$, —S(O)$_2O^-$, —S(O)$_2NR^1R^2$, —$NR^1$C(O)$R^2$, —$NR^1$C(O)$OR^2$, —$NR^1$C(O)$SR^2$, —$NR^1$C(O)$NR^2R^3$, —P(O)$_2R^1$, —P(O)(O$R^1$)$_2$, —P(O)(O$R^1$)$O^-$, and —P(O)(O$^-$)$_2$; wherein the index n is an integer from 0 to 4, preferably from 0 to 1, most preferably 0; —$NR^{34}R^{35}$ is positioned ortho or para to the bridging amine moiety and $R^{34}$ and $R^{35}$ are independently selected from the group consisting of hydrogen, alkyl, substituted alkyl, aryl, substituted aryl, alkaryl, substituted alkaryl, and $R^4$; $R^{33}$ is independently selected from the group consisting of hydrogen, —S(O)$_2R^1$, —C(O)N(H)$R^1$; —C(O)$OR^1$; and —C(O)$R^1$; when g is 2 to 4, any two adjacent $R^{31}$ groups may combine to form a fused ring of five or more members wherein no more than two of the atoms in the fused ring may be nitrogen atoms.

In the structure of Formula (V), wherein $X^{40}$ is selected from the group consisting of an oxygen atom, a sulfur atom, and $NR^{45}$; $R^{45}$ is independently selected from the group consisting of hydrogen, deuterium, alkyl, substituted alkyl, aryl, substituted aryl, alkaryl, substituted alkaryl, —S(O)$_2$OH, —S(O)$_2O^-$, —C(O)$OR^1$, —C(O)$R^1$, and —C(O)$NR^1R^2$; $R^{40}$ and $R^{41}$ are independently selected from the group consisting of —$(CH_2)$—O—$R^1$, —$(CH_2)$—$NR^1R^2$, wherein the index n is an integer from 0 to 4, preferably from 0 to 1, most preferably 0; j and k are independently integers from 0 to 3; $R^{42}$ and $R^{43}$ are independently selected from the group consisting of alkyl, substituted alkyl, aryl, substituted aryl, alkaryl, substituted alkaryl, —S(O)$_2R^1$, —C(O)$NR^1R^2$, —NC(O)$OR^1$, —NC(O)$SR^1$, —C(O)$OR^1$, —C(O)$R^1$, —$(CH_2)_n$—O—$R^1$, —$(CH_2)_n$—$NR^1R^2$; wherein the index n is an integer from 0 to 4, preferably from 0 to 1, most preferably 0; $R^{44}$ is —C(O)$R^1$, —C(O)$NR^1R^2$, and —C(O)$OR^1$.

In the structures of Formula (I)-(V), wherein any charge present in any of the preceding groups is balanced with a suitable independently selected internal or external counterion. Suitable independently selected external counterions may be cationic or anionic. Examples of suitable cations include but are not limited to one or more metals preferably selected from Group I and Group II, the most preferred of these being Na, K, Mg, and Ca, or an organic cation such as iminium, ammonium, and phosphonium. Examples of suitable anions include but are not limited to: fluoride, chloride, bromide, iodide, perchlorate, hydrogen sulfate, sulfate, aminosulfate, nitrate, dihydrogen phosphate, hydrogen phosphate, phosphate, bicarbonate, carbonate, methosulfate, ethosulfate, cyanate, thiocyanate, tetrachlorozincate, borate, tetrafluoroborate, acetate, chloroacetate, cyanoacetate, hydroxyacetate, aminoacetate, methylaminoacetate, di- and tri-chloroacetate, 2-chloro-propionate, 2-hydroxypropionate, glycolate, thioglycolate, thioacetate, phenoxyacetate, trimethylacetate, valerate, palmitate, acrylate, oxalate, malonate, crotonate, succinate, citrate, methylene-bis-thioglycolate, ethylene-bis-iminoacetate, nitrilotriacetate, fumarate, maleate, benzoate, methylbenzoate, chlorobenzoate, dichlorobenzoate, hydroxybenzoate, aminobenzoate, phthalate, terephthalate, indolylacetate, chlorobenzenesulfonate, benzenesulfonate, toluenesulfonate, biphenyl-sulfonate and chlorotoluenesulfonate. Those of ordinary skill in the art are well aware of different counterions which can be used in place of those listed above.

In the structures of Formula (I)-(V), $R^1$, $R^2$, $R^3$, and $R^{15}$ are independently selected from the group consisting of hydrogen, alkyl, substituted alkyl, aryl, substituted aryl, alkaryl, substituted alkaryl, and $R^4$; wherein $R^4$ is a organic group composed of one or more organic monomers with said monomer molecular weights ranging from 28 to 500, preferably 43 to 350, even more preferably 43 to 250, wherein the organic group may be substituted with one or more additional leuco colorant moieties conforming to the structure of Formula I-V. In one aspect, $R^4$ is selected from the group consisting of alkyleneoxy (polyether), oxoalkyleneoxy (polyesters), oxoalkyleneamine (polyamides), epichlorohydrin, quaternized epichlorohydrin, alkyleneamine, hydroxyalkylene, acyloxyalkylene, carboxyalkylene, carboalkoxyalkylene, and sugar. In one aspect, $R^4$ is selected from EO, PO, BO, and mixtures thereof, more preferably from EO alone or from EO/PO mixtures. Where any leuco colorant comprises an $R^4$ group with three or more contiguous monomers, that leuco colorant is defined herein as a "polymeric leuco colorant". One skilled in the art knows that the properties of a compound with regard to any of a number of characteristic attributes such as solubility, partitioning, deposition, removal, staining, etc., are related to the placement, identity and number of such contiguous monomers incorporated therein. The skilled artisan can therefore adjust the placement, identity and number of such contiguous monomers to alter any particular attribute in a more or less predictable fashion.

Preferred leuco colorants include those conforming to the structure of Formula VI,

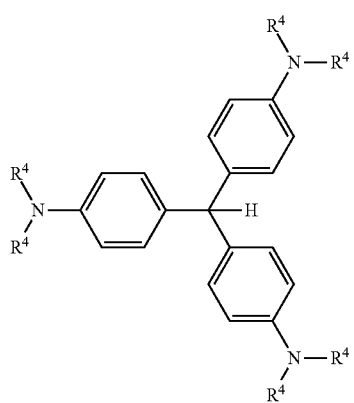

(VI)

wherein each $R^4$ is independently selected from the group consisting of H, Methyl, Ethyl, $((CH_2CH_2O)_a(C_3H_6O)_b)H$, and mixtures thereof; preferably at least one $R^4$ group is $((CH_2CH_2O)_a(C_3H_6O)_b)H$; wherein each index a is independently an integer from 1-100, each index b is independently an integer from 0-50, and wherein the sum of all the independently selected a integers in all $R^4$ groups is no more than 200, preferably no more than 100, and the sum of all the independently selected b integers in all $R^4$ groups is no more than 100, preferably no more than 50. Preferably at least two $R^4$ groups are selected from Methyl and Ethyl, most preferably at least one N in structure VI is substituted with two $R^4$ groups selected from Methyl and Ethyl, preferably Me.

Highly preferred leuco colorants include those conforming to the structure of Formula VII,

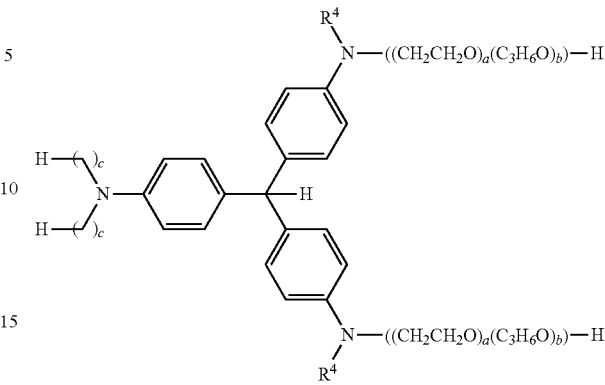

(VII)

wherein each index c is independently 0, 1 or 2, preferably each c is 1; each $R^4$ is independently selected from the group consisting of H, Me, Et, $((CH_2CH_2O)_a(C_3H_6O)_b)H$, and mixtures thereof; preferably each $R^4$ is $((CH_2CH_2O)_a(C_3H_6O)_b)H$ wherein each index a is independently an integer from 1-50, more preferably 1-25, even more preferably 1-20, 1-15, 1-10, 1-5 or even 1-2; each index b is independently an integer from 0-25, more preferably 0-15, even more preferably 1-5 or even 1-3 and wherein the sum of all the independently selected a integers in the leuco colorant is no more than 100, more preferably no more than 80, most preferably no more than 60, 40, 20, 10 or even no more than 5, and the sum of all the independently selected b integers in the leuco colorant is no more than 50, more preferably no more than 40, most preferably no more than 30, 20, or even 10. In a particularly preferred aspect, each index c is 1, each $R^4$ is $((CH_2CH_2O)_a(C_3H_6O)_b)H$, each index a is an integer from 1-5, each index b is an integer from 1-5, the sum of all the independently selected a integers in the leuco compound is from 4 to 10, and the sum of all the independently selected b integers in the leuco colorant is from 5 to 15.

In another aspect, highly preferred leuco compounds include those conforming to the structure of Formula (VIII),

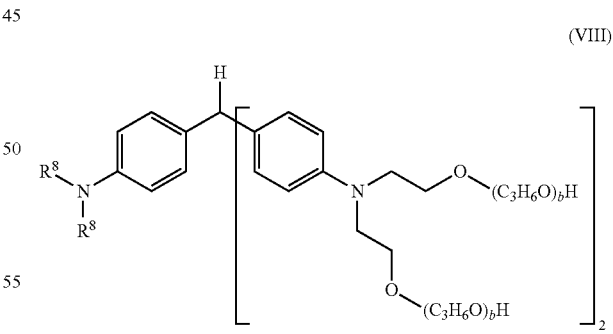

(VIII)

wherein $R^8$ is H or $CH_3$ and each index b is independently on average about 1 to 2.

The leuco triarylmethane compounds described herein can be produced by any suitable synthetic method. For example, such compounds can be produced via an acid catalyzed condensation reaction between an aromatic aldehyde and an electron-rich aryl coupler (e.g., in an amount of approximately 2 molar equivalents of aryl coupler to 1 molar equivalent of aromatic aldehyde). The aromatic aldecan be any suitable compound comprising an aromatic moiety (e.g., an aryl moiety, a substituted aryl moiety, a heteroaromatic moiety, or a substituted heteroaromatic moiety) having an aldehyde group covalently attached thereto. In one aspect, the aromatic aldehyde preferably is a substituted benzaldehyde comprising, preferably in the para position relative to the aldehyde group, a group having the structure —$OR^1$ or —$NR^1R^2$. In another aspect, the aromatic aldehyde preferably is a substituted benzaldehyde comprising the group —$NR^1R^2$ in the para position relative to the aldehyde group, wherein $R^1$ and $R^2$ are selected from the group consisting of hydrogen, methyl, or ethyl (more preferably methyl).

As noted above, the condensation reaction utilizes an aryl coupler in addition to the aromatic aldehyde. To produce the leuco triarylmethane compound, the condensation reaction generally utilizes at least two molar equivalents of aryl coupler for each molar equivalent of aromatic aldehyde. In one aspect, the two molar equivalents of aryl coupler utilized in the reaction can be provided using a single aryl coupler compound. In another aspect, the reaction can be performed using two molar equivalents of a mixture of two or more distinct aryl couplers. In such an embodiment, the two or more distinct aryl couplers can be used in any combination or relative ratios provided the mixture sums to at least about two molar equivalents of aryl couplers for each molar equivalent of aromatic aldehyde. In such an embodiment, the two or more distinct aryl couplers can differ in terms of, for example, the number and/or nature of the substituents attached to the aryl moiety. In one aspect, the reaction can utilize a first aryl coupler comprising a first oxyalkylene or polyoxyalkylene moiety having a first distribution of oxyalkylene groups and a second aryl coupler comprising a second oxyalkylene or polyoxyalkylene moiety having a second distribution of oxyalkylene groups that is different from the first distribution. For example, in one aspect, the first aryl coupler can comprise an oxyalkylene moiety consisting of ethylene oxide groups, such as AC-I below, and the second aryl coupler can comprise a polyoxyalkylene moiety consisting of ethylene oxide groups and propylene oxide groups, such as AC-II below.

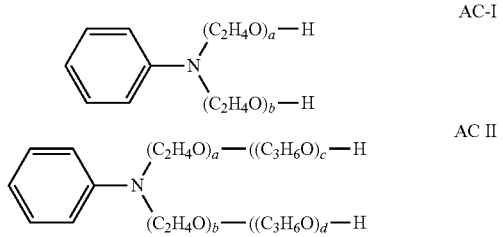

wherein the indices a, b, c and d are independently selected from integers from 0 to 5; the sum of a and b for a coupler selected from AC-I and AC-II is from 2 to 10, and the sum of c and d in AC-II is from 2 to 10. In a more particular aspect, the sum of a and b for a coupler selected from AC-I and AC-II is from 2 to 5, and the sum of c and d in AC-II is from 2 to 5. In one embodiment, the sum of the indices a and b in AC-I is 2 or 3; the sum of the indices a and b in AC-II is 2 or 3 and the sum of the indices c and d in AC-II is 1 to 5, preferably 2 to 4 or even 2 to 3. The couplers AC-I and AC-II may be combined in any proportion provided the amount of the couplers used is sufficient to provide at least two molar equivalents relative to the equivalents of the aromatic aldehyde used in the acid-catalyzed condensation reaction that gives rise to the leuco compound.

In one aspect, for example, one equivalent of para-N,N-dimethylbenzaldehyde is condensed with a mixture of at least two molar equivalents of the aryl couplers AC-I and AC-II shown above wherein for aryl coupler AC-I, the indices a and b sum to 2 or 3, preferably 2, and wherein preferably a and b are each 1; and wherein for aryl coupler AC-II, the indices a and b sum to 2 or 3, preferably 2, and wherein preferably a and b are each 1, and the indices c and d sum to an average of about 2.5 to 3.0, and wherein at least one of c or d is 1.

As will be appreciated, any leuco colorants may be suitable for incorporation into the precursor material 20 and particles 90.

Perfume

In addition to the PEG and leuco colorant in the precursor material 20, and thereby the particles 90, the precursor material 20, and thereby the particles 90, can further comprise 0.1% to about 20% by weight perfume. Alternatively, the particles 90, the precursor material 20, and thereby the particles 90, can be substantially free or free of perfume. The perfume can be unencapsulated perfume, encapsulated perfume, perfume provided by a perfume delivery technology, or a perfume provided in some other manner. Perfumes are generally described in U.S. Pat. No. 7,186,680 at column 10, line 56, to column 25, line 22. The precursor material 20, and thereby particles 90, can comprise unencapsulated perfume and are essentially free of perfume carriers, such as a perfume microcapsules. The precursor material 20, and there by particles 90, can comprise perfume carrier materials (and perfume contained therein). Examples of perfume carrier materials are described in U.S. Pat. No. 7,186,680, column 25, line 23, to column 31, line 7. Specific examples of perfume carrier materials may include cyclodextrin and zeolites.

The precursor material 20, and thereby particles 90, can comprise about 0.1% to about 20%, alternatively about 1% to about 15%, alternatively 2% to about 10%, alternatively combinations thereof and any whole percentages within any of the aforementioned ranges, of perfume by weight of the precursor material 20 or particles 90. The precursor material 20, and thereby particles 90, can comprise from about 0.1% by weight to about 6% by weight of the precursor material 20 or particles 90 of perfume. The perfume can be unencapsulated perfume and or encapsulated perfume.

The precursor material 20, and thereby particles 90, can be free or substantially free of a perfume carrier. The precursor material 20, and thereby particles 90, may comprise about 0.1% to about 20%, alternatively about 1% to about 15%, alternatively 2% to about 10%, alternatively combinations thereof and any whole percentages within any of the aforementioned ranges, of unencapsulated perfume by weight of the precursor material 20, and thereby particles 90.

The precursor material 20, and thereby particles 90, can comprise unencapsulated perfume and perfume microcapsules. The precursor material 20, and thereby particles 90, may comprise about 0.1% to about 20%, alternatively about 1% to about 15%, alternatively from about 2% to about 10%, alternatively combinations thereof and any whole percentages or ranges of whole percentages within any of the aforementioned ranges, of the unencapsulated perfume by weight of the precursor material 20, and thereby particles 90. Such levels of unencapsulated perfume can be appropriate for any of the precursor materials 20, and thereby particles 90, disclosed herein that have unencapsulated perfume.

The precursor material 20, and thereby particles 90, can comprise unencapsulated perfume and a perfume microcapsule but be free or essentially free of other perfume carriers. The precursor material 20, and thereby particles 90, can comprise unencapsulated perfume and perfume microcapsules and be free of other perfume carriers.

The precursor material 20, and thereby particles 90, can comprise encapsulated perfume. Encapsulated perfume can be provided as plurality of perfume microcapsules. A perfume microcapsule is perfume oil enclosed within a shell. The shell can have an average shell thickness less than the maximum dimension of the perfume core. The perfume microcapsules can be friable perfume microcapsules. The perfume microcapsules can be moisture activated perfume microcapsules.

The perfume microcapsules can comprise a melamine/formaldehyde shell. Perfume microcapsules may be obtained from Appleton, Quest International, or International Flavor & Fragrances, or other suitable source. The perfume microcapsule shell can be coated with polymer to enhance the ability of the perfume microcapsule to adhere to fabric. This can be desirable if the particles 90 are designed to be a fabric treatment composition. The perfume microcapsules can be those described in U.S. Patent Pub. 2008/0305982.

The precursor material 20, and thereby particles 90, can comprise about 0.1% to about 20%, alternatively about 1% to about 15%, alternatively 2% to about 10%, alternatively combinations thereof and any whole percentages within any of the aforementioned ranges, of encapsulated perfume by weight of the precursor material 20, or particles 90.

The precursor material 20, and thereby particles 90, can comprise perfume microcapsules but be free of or essentially free of unencapsulated perfume. The precursor material 20, and thereby particles 90, may comprise about 0.1% to about 20%, alternatively about 1% to about 15%, alternatively about 2% to about 10%, alternatively combinations thereof and any whole percentages within any of the aforementioned ranges, of encapsulated perfume by weight of the precursor material 20 or particles 90.

The precursor material 20 can be prepared by providing molten PEG into a batch mixer 10. The batch mixer 10 can be heated so as to help prepare the precursor material 20 at the desired temperature. Leuco colorant and perfume, if present, may be added to the molten PEG. Aesthetic dye, if present, can also be added to the batch mixer 10. Other adjunct materials can be added to the precursor material 20 if desired. The precursor material 20 can optionally be prepared by in-line mixing or other known approaches for mixing materials.

If an aesthetic dye is employed, the precursor material 20 and particles 90 may comprise aesthetic dye. The precursor material 20, and thereby particles 90, may comprise less than about 0.1%, alternatively about 0.001% to about 0.1%, alternatively about 0.01% to about 0.02%, alternatively combinations thereof and any hundredths of percent or ranges of hundredths of percent within any of the aforementioned ranges, of aesthetic dye by weight of the precursor material 20 or particles 90. Examples of suitable aesthetic dyes include, but are not limited to, LIQUITINT PINK AM, AQUA AS, CYAN 15, and VIOLET FL, available from Milliken Chemical.

The particles 90 may have a variety of shapes. The particles 90 may be formed into different shapes include tablets, pills, spheres, and the like. A particle 90 can have a shape selected from the group consisting of spherical, hemispherical, compressed hemispherical, lentil shaped, and oblong. Lentil shaped refers to the shape of a lentil bean. Compressed hemispherical refers to a shape corresponding to a hemisphere that is at least partially flattened such that the curvature of the curved surface is less, on average, than the curvature of a hemisphere having the same radius. A compressed hemispherical particle 90 can have a ratio of height to maximum based dimension of from about 0.01 to about 0.4, alternatively from about 0.1 to about 0.4, alternatively from about 0.2 to about 0.3. Oblong shaped refers to a shape having a maximum dimension and a maximum secondary dimension orthogonal to the maximum dimension, wherein the ratio of maximum dimension to the maximum secondary dimension is greater than about 1.2. An oblong shape can have a ratio of maximum base dimension to maximum secondary base dimension greater than about 1.5. An oblong shape can have a ratio of maximum base dimension to maximum secondary base dimension greater than about 2. Oblong shaped particles can have a maximum base dimension from about 2 mm to about 6 mm, a maximum secondary base dimension of from about 2 mm to about 6 mm.

Individual particles 90 can have a mass from about 0.1 mg to about 5 g, alternatively from about 10 mg to about 1 g, alternatively from about 10 mg to about 500 mg, alternatively from about 10 mg to about 250 mg, alternatively from about 0.95 mg to about 125 mg, alternatively combinations thereof and any whole numbers or ranges of whole numbers of mg within any of the aforementioned ranges. In a plurality of particles 90, individual particles can have a shape selected from the group consisting of spherical, hemispherical, compressed hemispherical, lentil shaped, and oblong.

An individual particle may have a volume from about 0.003 cm$^3$ to about 0.15 cm$^3$. A number of particles 90 may collectively comprise a dose for dosing to a laundry washing machine or laundry wash basin. A single dose of particles 90 may comprise, per 3 kg of fabric being laundered, from about 0.1 g to about 200 g, or from about 0.5 g to about 100 g, or from about 2.0 g to about 60 g, or from about 5 g to about 25 g of particles. A single dose of the particles 90 may comprise from about 1 g to about 27 g. A single dose of the particles 90 may comprise from about 5 g to about 27 g, alternatively from about 13 g to about 27 g, alternatively from about 14 g to about 20 g, alternatively from about 15 g to about 19 g, alternatively from about 18 g to about 19 g, alternatively combinations thereof and any whole numbers of grams or ranges of whole numbers of grams within any of the aforementioned ranges. The individual particles 90 forming the dose of particles 90 that can make up the dose can have a mass from about 0.95 mg to about 2 g. The plurality of particles 90 can be made up of particles having different size, shape, and/or mass. The particles 90 in a dose can have a maximum dimension less than about 1 centimeter.

Figure 4:
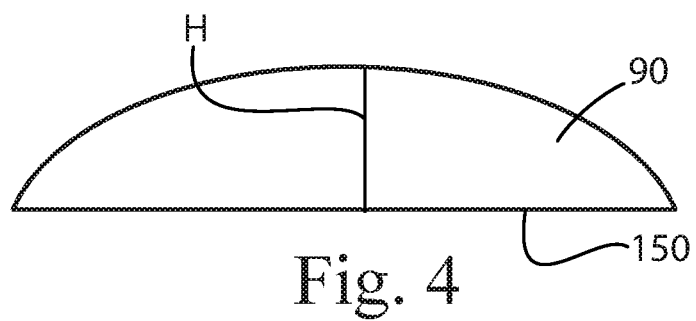
FIG. 4 is a profile view of a particle.

A particle 90 that can be manufactured as provided herein is shown in FIG. 4. FIG. 4 is a profile view of a single particle 90. The particle 90 can have a substantially flat base 150 and a height H. The height H of a particle 90 is measured as the maximum extent of the particle 90 in a direction orthogonal to the substantially flat base 150. The height H can be measured conveniently using image analysis software to analyze a profile view of the particle 90.

The process for forming particles 90 in which gas is entrained into the precursor material 20 thereby forming particles 90 have gas entrained therein can be practical for providing particles 90 that float in a liquid. Particles 90 that float in certain liquids can be practical in a variety of industrial processes and processes in the home in which particles can be used.

Particles 90 that have gas entrained therein are comprised of gas inclusions and solid and or liquid materials. Since the particles 90 in these embodiments have gas entrained therein, the particles 90 have a density that is less than the density of the constitutive solid and or liquid materials forming the particle 90. For instance if the particle 90 is formed of a constitutive material having a density of 1 g/cm$^3$, and the particle 90 is 10% by volume air, the density of the particle 90 is 0.90 g/cm$^3$.

Figure 5:
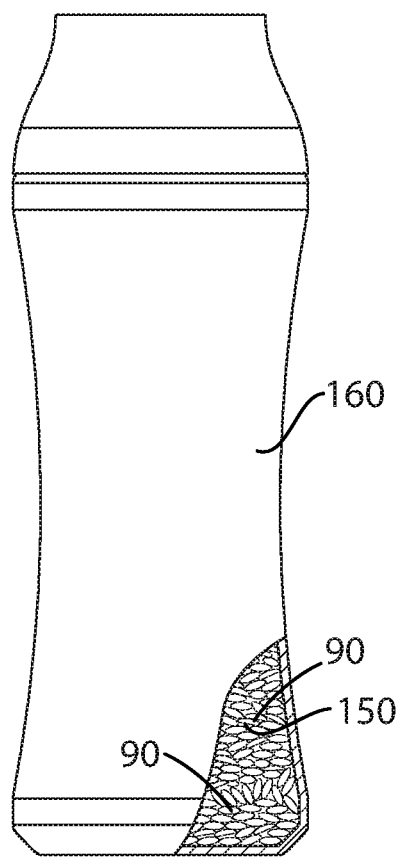
FIG. 5 is a laundry care composition comprising a plurality of particles.

The particles 90 can be packaged together as a laundry care composition 160 comprising a plurality of particles 90, as shown in FIG. 5. The particles can comprise a carrier, leuco colorant, perfume, and occlusions of gas. Without being bound by theory, spherical occlusions of gas are thought to provide for improved strength of the particles 90 as compared to particles 90 having occlusions of gas having other shapes. Spherical occlusions of gas might provide for improved strength over non-spherical occlusions of gas.

In embodiments that do not include occlusions of air, at least 80%, 90%, 95%, substantially all of the particles 90 can have a density greater than about 1 g/cm$^3$ and preferably less than about 1.25 g/cm$^3$. In embodiments that do include occlusions of air, at least 80%, 90%, 95%, substantially all of the particles 90 can have a density less than about 0.95 g/cm$^3$. Since the density of a typical washing solution is about 1 g/cm$^3$, it can be desirable to provide particles 90 that have a density greater than about 1 g/cm$^3$ or, in some embodiments, less than about 0.95 g/cm$^3$. Having nearly all of the particles 90 have a density greater than about 1 g/cm$^3$ can be desirable for providing for particles 90 that sink in a wash liquor. Having nearly all of the particles 90 have a density less than about 1 g/cm$^3$ can be desirable for providing for particles 90 that float in a wash liquor.

At least 80%, 90%, 95%, substantially all of the particles 90 can have a mass between about 0.1 mg to about 5 g. Particles 90 can have a maximum dimension of less than about 20 mm. Particles 90 can have a maximum dimension of less than about 10 mm. Particles 90 having such a mass and maximum dimension are thought to be readily dissolvable in solutions such a wash solutions used in laundering clothing.

Each of the particles 90 can have a volume and the occlusions of gas within the particles 90 can comprise between about 0.5% to about 50% by volume of the particle 90, or even between about 1% to about 20% by volume of the particle, or even between about 2% to about 15% by volume of the particle, or even between about 4% to about 12% by volume of the particle. Without being bound by theory, it is thought that if the volume of the occlusions of gas is too great, the particles 90 may not be sufficiently strong to be packaged, shipped, stored, and used without breaking apart in an undesirable manner.

The occlusions can have an effective diameter between about 1 micron to about 2000 microns, or even between about 5 microns to about 1000 microns, or even between about 5 microns to about 200 microns, or even between about 25 to about 50 microns. In general, it is thought that smaller occlusions of gas are more desirable than larger occlusions of gas. If the effective diameter of the occlusions of gas are too large, it is thought that the particles might not be sufficiently strong to be to be packaged, shipped, stored, and used without breaking apart in an undesirable manner. The effective diameter is diameter of a sphere having the same volume as the occlusion of gas. The occlusions of gas can be spherical occlusions of gas.

Particles 90 can be produced as follows. A 50 kg batch of precursor material 20 can be prepared in a mixer. Molten PEG8000 can be added to a jacketed mixer held at 70° C. and agitated with a pitch blade agitator at 125 rpm. Butylated hydroxytoluene can be added to the mixer at a level of 0.01% by weight of the precursor material 20. Dipropylene glycol can be added to the mixer at a level of 1.08% by weight of the precursor material 20. A water based slurry of perfume microcapsules can be added to the mixer at a level of 4.04% by weight of the precursor material 20. Unencapsulated perfume can be added to the mixer at a level of 7.50% by weight of the precursor material 20. Leuco colorant can be added to the mixer at a level of 0.0095% by weight of the precursor material 20. The PEG can account for 87.36% by weight of the precursor material 20. The precursor material 20 can be mixed for 30 minutes.

The precursor material 20 can be formed into particles 90 on a SANDVIK ROTOFORM 3000 having a 750 mm wide 10 m long belt. The cylinder 110 can have 2 mm diameter apertures 60 set at a 10 mm pitch in the cross machine direction CD and 9.35 mm pitch in the machine direction MD. The cylinder can be set at approximately 3 mm above the belt. The belt speed and rotational speed of the cylinder 110 can be set at 10 m/min.

After mixing the precursor material 20, the precursor material 20 can be pumped at a constant 3.1 kg/min rate from the mixer 10 through a plate and frame heat exchanger set to control the outlet temperature to 50° C.

Air or another gas can be entrained in the precursor material 20 at a level of about 0.5% to about 50% by volume. The precursor material 20 having air or another gas entrained therein can be passed through a Quadro Z1 mill with medium rotor/stator elements. After milling, the precursor material can optionally be passed through a Kenics 1.905 cm KMS 6 static mixer 50 installed 91.44 cm upstream of the stator 100.

Table 1 lists formulations for particles 90 that could be made. As will be appreciated, many additional formulas could be prepared, and those shown below are not meant to be limiting in any way.

TABLE 1

| % Wt | Potential formulations for particles. | | | | | | |
|---|---|---|---|---|---|---|---|
|  | F1 | F2 | F3 | F4 | F5 | F6 | F7 |
| PEG 8000 or 9000 | 82.8 | 82.8 | 86.9 | 88.9 | 95.5 | 82.0 | 82.0 |
| Antioxidant | 0.01-0.10 | 0.014 | 0.017 | — | 0-0.02 | 0.021 | 0.085 |
| Perfume Microcapsule | 1.28 | 1.28 | 0.815 | 3.80 | 1.62 | — | — |
| Neat Perfume Oil | 6.65 | 6.65 | 5.80 | 3.84 | — | 8.58 | — |
| Dipropylene Glycol | 5.82 | 5.82 | 4.87 | 1.58 | — | 7.44 | 5.80 |
| Leuco colorant | 0.150 | 0.095 | 0.030 | 0.020 | 0.025 | 0.055 | 0.055 |

TABLE 1-continued

Potential formulations for particles.

| % Wt | F1 | F2 | F3 | F4 | F5 | F6 | F7 |
|---|---|---|---|---|---|---|---|
| Shading dye | — | 0.005 | — | — | 0.01 | — | — |
| Water and Minors | | | | Balance | | | |
| % Air by Volume of Particle | 0-5% | 15 | 21.5 | 30.5 | 5.5 | 44.9 | 35.8 |

Example

Fabric swatches used herein were obtained from Testfabrics, Inc. West Pittston, Pa., and are 100% Cotton, Style 403 (cut to 4"×4"). Swatches are stripped prior to use by washing at 49° C. two times with heavy duty liquid laundry detergent nil brightener (1.55 g/L in aqueous solution), Reflectance measurements are made on the stripped swatches prior to washing. All reflectance spectra and color measurements, including L*, a*, b*, and Whiteness Index (WI CIE) values on dry fabric swatches, were made using a LabScan XE reflectance spectrophotometer (HunterLabs, Reston, Va.; D65 illumination, 10° observer, UV light excluded).

Three unique samples of polyethylene glycol beads were prepared, one containing no colorant (control Bead C), another containing a traditional shading dye (Bead S), and another with a leuco colorant (Bead L). The general procedure for preparing the beads involves setting a hot plate to a temperature of 85° C., weighing out the appropriate ingredients, mixing them together in a beaker, placing the beaker on the hot plate and bringing the contents to temperature, and thereafter hand pipetting the mixture into a mold for making uniform sized beads and allowing to cool. The individual beads so formed were of a size that four such beads weighed approximately 0.140-0.145 g. The composition of the three beads are shown in the Table below.

| Ingredient | Ingredient Weight (g) | | |
|---|---|---|---|
| | Bead C | Bead S | Bead L |
| PEG 8000 | 120.0 | — | — |
| PEG 9000 | — | 119.80 | 119.28 |
| Shading dye[a] | — | 0.25 | — |
| Leuco Colorant 2[b] | — | — | 0.75 |

[a]Contains 5 wt % Dye 1 in PEG 200.

[b]Leuco Colorant 2 is 33 wt % active in PEG 200.

The structures of Dye 1 and Leuco Colorant 2 are shown below. Bead S contained 0.20 wt % of the Shading dye and Bead L contained 0.20 wt % active of Leuco Colorant 2.

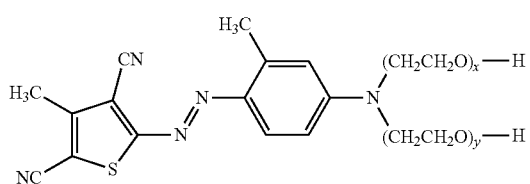

$(2 \leq (x + y) \leq 10$; average value of $x + y = 5)$

Leuco Colorant 2

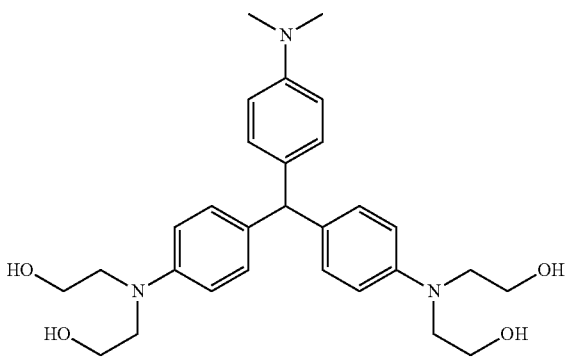

Test wash solutions were prepared by dissolving one Tide Free & Gentle Pod in 3.0 L of DI water at room temperature. Once dissolved, 63.55 g of the resulting solution was added to 1.3 L of DI water to prepare the final wash solution. This is the equivalent of dissolving one such Pod in a top loading washing machine containing about 64 L of water. Each of four 500 mL Erlenmeyer flasks was charged with three test swatches and 230 mL of the wash solution along with two 10 mm glass marbles. Each flask is dosed with a 10,000 gpg stock hardness solution to achieve a final wash hardness of 6 gpg (3:1 Ca:Mg). The liquor to fabric ratio for these treatments was 25:1. One wash solution had no beads added. The other three each had four beads added with weights as indicated below.

| Treatment | Wash solution (mL) | Bead ID and weight (g) |
|---|---|---|
| 1 | 230 | NA |
| 2 | 230 | 0.141 g, Bead C |
| 3 | 230 | 0.145 g, Bead S |
| 4 | 230 | 0.143 g, Bead L |

The flasks are placed on a Model 75 wrist action shaker (Burrell Scientific, Inc., Pittsburgh, Pa.) and agitated at the maximum setting for 12 minutes, after which the wash solution is removed by aspiration, a volume of rinse water (0 gpg) equivalent to the amount of wash solution used is added before agitating 4 more minutes. The rinse is removed by aspiration and the fabric swatches are spun dry (Mini Countertop Spin Dryer, The Laundry Alternative Inc., Nashua, N.H.) for 2 minutes, then placed in a food dehydrator set at 135° F. to dry in the dark for 2 hours.

Reflectance measurements are taken at 2 hours and 48 hours after drying. The WI CIE values of the three swatches generated for each wash treatment are averaged and the change in whiteness index on washing is calculated using the following equation:

ΔWI=WI CIE (after wash)−WI CIE (before wash)

The change in whiteness index due to the addition of the three beads is calculated as the δΔWI CIE and is included in the table below.

| Treatment | 2 Hours | | 48 Hours | |
| --- | --- | --- | --- | --- |
| | ΔWI CIE | δΔWI CIE | ΔWI CIE | δΔWI CIE |
| 1 (No Bead) | 1.46 | — | 1.62 | — |
| 2 (Bead C) | 1.09 | −0.37 | 1.27 | −0.18 |
| 3 (Bead S) | 3.27 | 1.81 | 3.23 | 1.78 |
| 4 (Bead L) | 3.79 | 2.33 | 6.97 | 5.51 |

The addition of a PEG only bead (Bead C) to the wash has no impact on the whiteness of the fabric washed therein. Both the shading dye 1 and leuco colorant 2 provide whiteness benefits. It is evident from the δΔWI values that Bead L containing the Leuco colorant 2, when added to a wash solution, is able to provide whitening to a fabric that is comparable at 2 hours to that of Bead S containing a traditional shading dye, and superior at 48 hours.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A laundry care composition comprising a plurality of particles (90), wherein the particles comprise:
   a) from 20% to about 99.9% of polyethylene glycol carrier having a weight average molecular weight from about 2000 to about 13,000; and
   b) a leuco colorant;
   wherein at least 80% of said particles have a density less than about 1.25 g/cm$^3$;
   wherein at least 80% of said particles have a mass between about 0.1 mg to about 5 g;
   and wherein each of said particles has a maximum dimension of less than about 10 mm.

2. The laundry care composition according to claim 1, wherein the leuco colorant is selected from the group consisting of a diarylmethane leuco, a triarylmethane leuco, an oxazine leuco, a thiazine leuco, a hydroquinone leuco, an arylaminophenol leuco and mixtures thereof.

3. The laundry care composition according to claim 1, wherein the leuco colorant is selected from one or more compounds selected from the group consisting of:

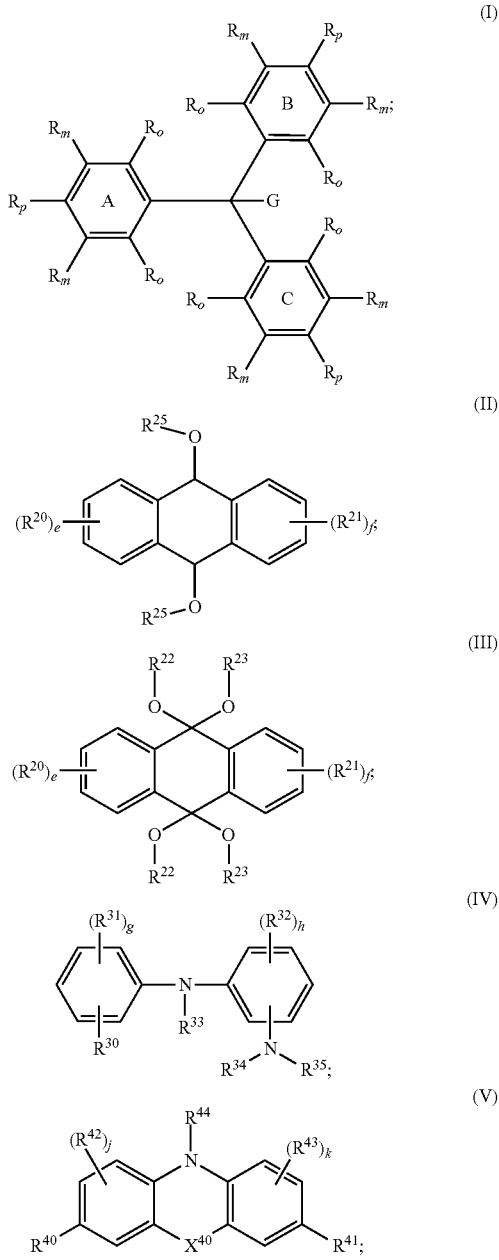

and
(f) mixtures thereof;
wherein the ratio of Formula I-V to its oxidized form is at least 1:3; wherein each individual $R_o$, $R_m$ and $R_p$ group on each of rings A, B and C is independently selected from the group consisting of hydrogen, deuterium and $R^5$; wherein each $R^5$ is independently selected from the group consisting of halogens, nitro, alkyl, substituted alkyl, aryl, substituted aryl, alkaryl, substituted alkaryl, —C(O)R$^1$, —C(O)OR$^1$, —C(O)O$^-$, —C(O)NR$^1$R$^2$, —OC(O)R$^1$, —OC(O)OR$^1$, —OC(O)NR$^1$R$^2$, —S(O)$_2$R$^1$, —S(O)$_2$OR$^1$, —S(O)$_2$O$^-$, —S(O)$_2$NR$^1$R$^2$, —NR$^1$C(O)R$^2$, —NR$^1$C(O)OR$^2$, —NR$^1$C(O)SR$^2$, —NR¹C(O)NR²R³, —OR¹, —NR¹R², —P(O)₂R¹, —P(O)(OR¹)₂, —P(O)(OR¹)O⁻, and —P(O)(O⁻)₂; wherein at least one of the $R_o$ and $R_m$ groups on at least one of the three rings A, B or C is hydrogen; each $R_p$ is independently selected from hydrogen, —OR¹ and —NR¹R²;

wherein G is independently selected from the group consisting of hydrogen, deuterium, $C_1$-$C_{16}$ alkoxide, phenoxide, bisphenoxide, nitrite, nitrile, alkyl amine, imidazole, arylamine, polyalkylene oxide, halides, alkylsulfide, aryl sulfide, and phosphine oxide;

wherein $R^1$, $R^2$ and $R^3$ are independently selected from the group consisting of hydrogen, alkyl, substituted alkyl, aryl, substituted aryl, alkaryl, substituted alkaryl, and $R^4$; $R^4$ is a organic group composed of one or more organic monomers with said monomer molecular weights ranging from 28 to 500;

wherein e and f are independently integers from 0 to 4;

wherein each $R^{20}$ and $R^{21}$ is independently selected from the group consisting of a halogen, a nitro group, alkyl groups, substituted alkyl groups, —NC(O)OR¹, —NC(O)SR¹, —OR¹, and —NR¹R²;

wherein each $R^{25}$ is independently selected from the group consisting of a monosaccharide moiety, a disaccharide moiety, an oligosaccharide moiety, a polysaccharide moiety, —C(O)R¹, —C(O)OR¹, —C(O)NR¹R²;

wherein each $R^{22}$ and $R^{23}$ is independently selected from the group consisting of hydrogen, an alkyl group, and substituted alkyl groups;

wherein $R^{30}$ is positioned ortho or para to the bridging amine moiety and is selected from the group consisting of —OR³⁸ and —NR³⁶R³⁷, wherein each $R^{36}$ and $R^{37}$ is independently selected from the group consisting of hydrogen, an alkyl group, a substituted alkyl group, an aryl group, a substituted aryl group, an acyl group, $R^4$, —C(O)OR¹, —C(O)R¹, and —C(O)NR¹R²;

wherein $R^{38}$ is selected from the group consisting of hydrogen, an acyl group, —C(O)OR¹, —C(O)R¹, and —C(O)NR¹R²;

wherein g and h are independently integers from 0 to 4;

wherein each $R^{31}$ and $R^{32}$ is independently selected from the group consisting of an alkyl group, a substituted alkyl group, an aryl group, a substituted aryl group, an alkaryl, substituted alkaryl, —C(O)R¹, —C(O)OR¹, —C(O)O⁻, —C(O)NR¹R², —OC(O)R¹, —OC(O)OR¹, —OC(O)NR¹R², —S(O)₂R¹, —S(O)₂OR¹, —S(O)₂O⁻, —S(O)₂NR¹R², —NR¹C(O)R², —NR¹C(O)OR², —NR¹C(O)SR², —NR¹C(O)NR²R³, —OR¹, —NR¹R², —P(O)₂R¹, —P(O)(OR¹)₂, —P(O)(OR¹)O⁻, and —P(O)(O⁻)₂;

wherein —NR³⁴R³⁵ is positioned ortho or para to the bridging amine moiety and $R^{34}$ and $R^{35}$ are independently selected from the group consisting of hydrogen, an alkyl, a substituted alkyl, an aryl, a substituted aryl, an alkaryl, a substituted alkaryl, and $R^4$;

wherein $R^{33}$ is independently selected from the group consisting of hydrogen, —S(O)₂R¹, —C(O)N(H)R¹; —C(O)OR¹; and —C(O)R¹; wherein when g is 2 to 4, any two adjacent $R^{31}$ groups may combine to form a fused ring of five or more members wherein no more than two of the atoms in the fused ring may be nitrogen atoms;

wherein $X^{40}$ is selected from the group consisting of an oxygen atom, a sulfur atom, and $NR^{45}$; wherein $R^{45}$ is independently selected from the group consisting of hydrogen, deuterium, an alkyl, a substituted alkyl, an aryl, a substituted aryl, an alkaryl, a substituted alkaryl, —S(O)₂OH, —S(O)₂O⁻, —C(O)OR¹, —C(O)R¹, and —C(O)NR¹R²;

wherein $R^{40}$ and $R^{41}$ are independently selected from the group consisting of —OR¹ and —NR¹R²;

wherein j and k are independently integers from 0 to 3;

wherein $R^{42}$ and $R^{43}$ are independently selected from the group consisting of an alkyl, a substituted alkyl, an aryl, a substituted aryl, an alkaryl, a substituted alkaryl, —S(O)₂R¹, —C(O)NR¹R², —NC(O)OR¹, —NC(O)SR¹, —C(O)OR¹, —C(O)R¹, —OR¹, —NR¹R²; wherein $R^{44}$ is —C(O)R¹, —C(O)NR¹R², and —C(O)OR¹; wherein any charge present in any of the compounds is balanced with a suitable independently selected internal or external counterion.

4. The laundry care composition according to claim 3, wherein the leuco colorant conforms to the structure of Formula VI,

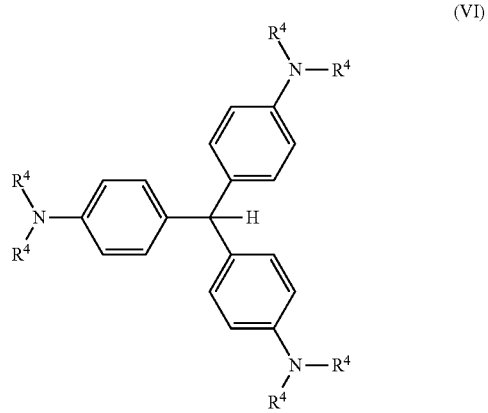

(VI)

wherein each $R^4$ is independently selected from the group consisting of H, Methyl, Ethyl, $((CH_2CH_2O)_a(C_3H_6O)_b)H$, and mixtures thereof, wherein at least one $R^4$ group is $((CH_2CH_2O)_a(C_3H_6O)_b)H$, wherein each index a is independently an integer from 1-100, each index b is independently an integer from 0-50, and wherein the sum of all the independently selected a integers in all $R^4$ groups is no more than 200, and the sum of all the independently selected b integers in all $R^4$ groups is no more than 100, at least two $R^4$ groups are selected from Methyl and Ethyl.

5. The laundry care composition according to claim 4, wherein the leuco colorant conforms to the structure of Formula VII

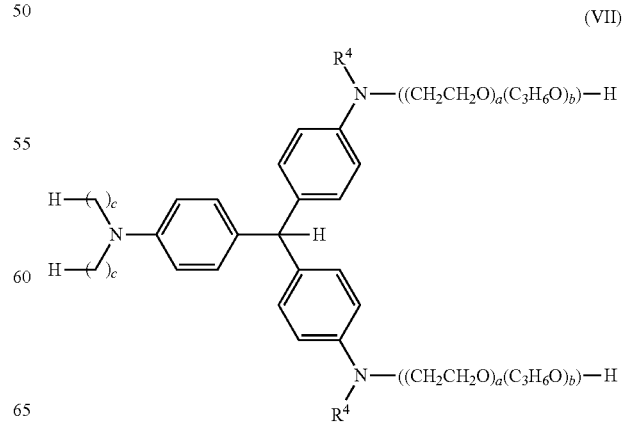

(VII)

wherein each index c is independently 0, 1 or 2; each $R^4$ is independently selected from the group consisting of H, Me, Et, ((CH2CH2O)a(C3H6O)b)H, and mixtures thereof, wherein each index a is independently an integer from 1-50; each index b is independently an integer from 0-25, wherein the sum of all the independently selected a integers in the leuco colorant is no more than 100, and the sum of all the independently selected b integers in the leuco colorant is no more than 50.

6. The laundry care composition according to claim 5, wherein the leuco colorant conforms to the structure of Formula VIII

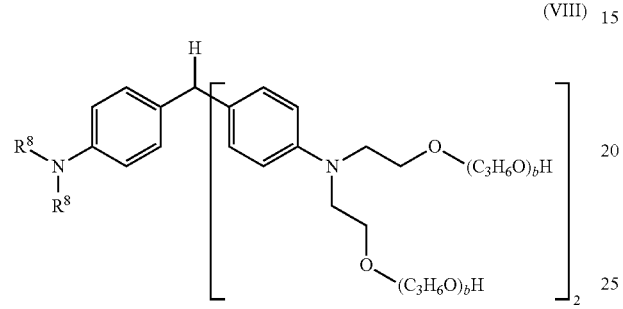

(VIII)

wherein $R^8$ is H or $CH_3$ and each index b is independently on average about 1 to 2.

7. The laundry care composition according to claim 1, wherein said particles comprise perfume.

8. The laundry care composition according to claim 1, wherein said particles are substantially free of perfume.

9. The laundry care composition according to claim 1, wherein said particles comprise occlusions of gas.

10. The laundry care composition according to claim 9, wherein each of said particles has a volume and said occlusions of gas within said particle comprise between about 0.5% to about 50% by volume of said particle.

11. The laundry care composition according to claim 1, wherein said carrier and insert comprises an additional carrier selected from the group consisting of water soluble organic alkali metal salt, water soluble inorganic alkaline earth metal salt, water soluble organic alkaline earth metal salt, water soluble carbohydrate, water soluble silicate, water soluble urea, starch, clay, water insoluble silicate, citric acid carboxymethyl cellulose, fatty acid, fatty alcohol, glyceryl diester of hydrogenated tallow, glycerol, polyethylene glycol, polyvinyl alcohol and combinations thereof.

12. The laundry care composition according to claim 1, further comprising from about 0.001% to less than about 90% of a fabric care adjunct.

13. The laundry care composition according to claim 1, further comprising from about 0.001% to about 2% of an anti-oxidant selected from the group consisting of hindered phenols, diarylamines, and mixtures thereof.

14. A process for treating laundry comprising the step of dosing to a laundry washing machine or a laundry wash basin from about 2 g to about 60 g of the laundry care composition according to claim 1.

* * * * *